(12) United States Patent
Huynh et al.

(10) Patent No.: US 7,869,229 B2
(45) Date of Patent: Jan. 11, 2011

(54) COMPENSATING FOR CORD RESISTANCE TO MAINTAIN CONSTANT VOLTAGE AT THE END OF A POWER CONVERTER CORD

(75) Inventors: Steven Huynh, Sunnyvale, CA (US); Matthew Grant, Palo Alto, CA (US); David Kunst, Cupertino, CA (US); Zhibo Tao, San Jose, CA (US)

(73) Assignee: Active-Semi, Inc. (VG)

( * ) Notice: Subject to any disclaimer, the term of this patent is extended or adjusted under 35 U.S.C. 154(b) by 709 days.

(21) Appl. No.: 11/897,131

(22) Filed: Aug. 28, 2007

(65) Prior Publication Data
US 2008/0259654 A1 Oct. 23, 2008

Related U.S. Application Data

(63) Continuation-in-part of application No. 11/789,160, filed on Apr. 23, 2007.

(51) Int. Cl.
*H02M 3/335* (2006.01)

(52) U.S. Cl. .............. 363/21.01; 363/21.04; 363/21.12; 340/636.12

(58) Field of Classification Search .............. 363/21.01, 363/21.02, 21.04, 21.12–21.18, 22, 24
See application file for complete search history.

(56) References Cited

U.S. PATENT DOCUMENTS

| | | | | |
|---|---|---|---|---|
| 5,455,757 A | * | 10/1995 | Nguyen et al. | 363/21.16 |
| 6,304,461 B1 | | 10/2001 | Walker | 363/17 |
| 6,555,990 B1 | * | 4/2003 | Yang | 320/113 |
| 6,958,920 B2 | | 10/2005 | Mednik et al. | 363/19 |
| 7,091,872 B1 | * | 8/2006 | Bigelow et al. | 340/664 |
| 2004/0004467 A1 | * | 1/2004 | Miyanaga et al. | 323/277 |
| 2005/0259455 A1 | * | 11/2005 | Mori | 363/123 |
| 2007/0120547 A1 | * | 5/2007 | Tateishi et al. | 323/282 |
| 2007/0121349 A1 | | 5/2007 | Mednik et al. | 363/21.01 |

* cited by examiner

*Primary Examiner*—Edward Tso
*Assistant Examiner*—Arun Williams
(74) *Attorney, Agent, or Firm*—Imperium Patent Works; Darien K. Wallace

(57) ABSTRACT

A cord correction circuit in a primary-side-controlled flyback converter compensates for the loss of output voltage caused by the resistance of the charger cord. In one embodiment, a correction voltage is subtracted from a feedback voltage received from a primary-side auxiliary inductor. A pre-amplifier then compares a reference voltage to the corrected feedback voltage. In another embodiment, the correction voltage is summed with the reference voltage, and the pre-amplifier compares the feedback voltage to the corrected reference voltage. The difference between the voltages on the input leads of the pre-amplifier is used to increase the output voltage to compensate for the voltage lost through the charger cord. The flyback converter also has a comparing circuit and a control loop that maintain the peak level of current flowing through the primary inductor of the converter. Adjusting the frequency and pulse width of an inductor switch signal controls the converter output current.

23 Claims, 14 Drawing Sheets

ADJUSTING PEAK CURRENT TO
COMPENSATE FOR PROPAGATION DELAY

COMPENSATING FOR CORD RESISTANCE TO MAINTAIN CONSTANT VOLTAGE AT THE END OF A POWER CONVERTER CORD

CROSS REFERENCE TO RELATED APPLICATIONS

This application is a continuation-in-part of, and claims priority under 35 U.S.C. §120 from, nonprovisional U.S. patent application Ser. No. 11/789,160 entitled "Primary Side Constant Output Current Controller With Highly Improved Accuracy," filed on Apr. 23, 2007, the subject matter of which is incorporated herein by reference.

TECHNICAL FIELD

The present invention relates generally to the field of power conversion and, more particularly, to switch mode power supply circuits that regulate output current and voltage.

BACKGROUND

Over the years, various integrated circuit chips have been developed and used to build constant current, constant voltage flyback power supplies for many power supply applications, including off-line AC/DC power supply adapters, chargers, and standby power supplies for portable electronic equipment.

FIG. 1 (prior art) illustrates an exemplary prior art constant output current flyback converter 10 controlled on the secondary side of a transformer 11. Transformer 11 has three windings: a primary-side winding Lp, a secondary-side winding Ls, and an auxiliary winding La. Converter 10 has a primary switch 12, which is an external metal-oxide semiconductor field-effect transistor (MOSFET). Flyback converter 10 also has a secondary side resistor 13 that represents the resistive loss of the copper windings of transformer 11, a first current sense resistor 14, a secondary rectifier 15, an output capacitor 16, an optical coupler 17, a second current sense resistor 18, a bias resistor 19, a current limit transistor 20, and a conventional peak-current-mode pulse width modulation (PWM) control integrated circuit (IC) 21. The initial start-up energy for control IC 21 is provided by a resistor 22 and a capacitor 23. Once flyback converter 10 is stable, auxiliary winding La of transformer 11 powers IC 21 via a rectifier 24. Second current sense resistor 18 and transistor 20 control the output current. Transistor 20 regulates the voltage across second current sense resistor 18 to a preset base-emitter voltage (VBE). The output current of flyback converter 10 is, therefore, equal to VBE divided by the resistance of second current sense resistor 18. One disadvantage of flyback converter 10 is that both the base-emitter voltage and the output current vary with temperature. Moreover, the base-emitter voltage causes significant power loss. In addition, flyback converter 10 is costly because the safety-approved optical coupler 17 adds a significant cost to the overall material cost.

FIG. 2A (prior art) illustrates a second exemplary prior art constant output current flyback converter 25 controlled on the primary side of transformer 11. Flyback converter 25 does not include the optical coupler integrated circuit of flyback converter 10, nor the current sense components on the secondary side of the transformer. Flyback converter 25, however, suffers from output current inaccuracy because (a) the primary inductor of the transformer varies, and (b) the actual peak current of the primary inductor Lp differs slightly from that indicated by the current sense voltage Vcs divided by the resistance of resistor 14. Variations in the primary inductor of transformer 11 cause the output current of flyback converter 25 to vary with the primary inductance. The actual peak current of the primary inductor Lp differs slightly from that set by the sense resistor voltage Vcs divided by the resistance of resistor 14 due to propagation delay of a current sense comparator in control IC 21, as well as the delay associated with the turning off of external MOSFET 12.

FIG. 2B (prior art) illustrates peak current detection errors in flyback converter 25 of FIG. 2A. The on/off gate drive voltage of main switch 12 in FIG. 2A is illustrated by the waveform GATE. At time T1, GATE goes high, and MOSFET 12 turns on. The primary inductor current ILP ramps up linearly at the rate dI/dt=Vp/Lp, where Vp is the voltage across the primary inductor, and Lp is the inductance of the primary inductor. Thus, the sense resistor voltage Vcs will also ramp up proportionally. The sensed voltage signal Vcs reaches Vref at T2, at which time it is assumed that the peak primary current Ip is Vref/Rcs, where Rcs is the resistance of current sense resistor 14. However, due to the propagation delay of the current limit comparator and the delays in pulse width modulation (PWM) logic and drivers in control IC 21, GATE does not go low and turn off until T3. The period (T3−T2) is the GATE turn-off delay. The drain of MOSFET 12 will fly up when the switch turns off at T3, but the primary inductor current $I_{LP}$ will continue to rise until the drain voltage of MOSFET 12 reaches VIN at time T4 and the polarity of the voltage across the primary inductor Lp reverses. As a result, the final primary inductor peak current is Ipf instead of Ip. Unfortunately, the final primary inductor peak current Ipf varies because (T3−T2) and (T4−T3) vary with temperature, input line voltage, IC process variations, external component tolerances, and printed circuit board (PCB) layout variations. All of these variations produce errors that detract from the accuracy of the regulation of the overall output current by flyback converter 25.

In view of the foregoing, a method is sought for regulating the output current of a flyback converter that both employs primary side control and that is relatively low cost. The method should overcome the limitations of the prior art described above by using a minimal number of integrated circuits and external components. The method should eliminate the need for a secondary circuit and an optical coupler. Moreover, the output current of the flyback converter should be largely insensitive to temperature, input line voltage, IC process variation, external component value tolerances, and PCB layout variations.

SUMMARY

A flyback converter includes a transformer that converts an input voltage into a different output voltage. In one embodiment, the input voltage is the voltage from a wall outlet, and the output voltage is used to charge a portable electronic consumer device. When a main power switch in the converter is turned on, a current starts flowing through the primary winding of the transformer. After current ramps up through the primary winding to a peak magnitude and is then cut, a collapsing magnetic field around the primary winding transfers energy to a secondary winding. The energy transferred to the secondary winding is output from the flyback converter as the output current with the different output voltage. In some applications, such as charging an electronic consumer device, it is desirable for the output current to be maintained at a constant level.

The flyback converter generates a constant output current at a current level that falls within a specified tolerance despite any deviation of the actual inductance of the windings from the stated inductance that the windings are supposed to exhibit. In addition, the flyback converter generates a constant output current by adjusting the peak current flowing through the primary winding to an appropriate level. The flyback converter adjusts the peak current flowing through the primary winding to compensate for propagation delays and parasitics in the control circuits that would otherwise prevent the accurate detection of when the current flowing through the primary winding has reached its peak.

A comparing circuit and a control loop in an adaptive current limiter are used to maintain the peak current at the appropriate level. An inductor switch is controlled by an inductor switch control signal that has a pulse width. The current that flows through the inductor increases at a ramp-up rate during a ramp time until the ramp time ends at a first time. At the first time, the inductor current stops increasing. The comparing circuit generates a timing signal that indicates a target time at which the inductor current would reach a predetermined current limit if the inductor current continued to increase at the ramp-up rate. The control loop then receives the timing signal and compares the first time to the target time.

A pulse width generator generates a pulse width signal that controls the pulse width of the inductor switch control signal. The pulse width generator increases the pulse width when the first time occurs before the target time. The pulse width is adjusted so that the first time and the target time occur simultaneously. By adjusting the pulse width, the peak magnitude of the current flowing through the inductor is controlled at an appropriate level.

In another embodiment, a comparing circuit receives a feedback signal indicative of a first time at which an inductor current flowing through an inductor stops increasing. The comparing circuit also receives a switch signal indicative of a ramp-up rate at which the inductor current increases. The comparing circuit generates a timing signal that indicates a target time at which the inductor current would reach a predetermined current limit if the inductor current continued to increase at the ramp-up rate. An inductor switch control signal with a pulse width is then generated. The pulse width of the inductor switch control signal is controlled such that the first time and the target time occur simultaneously. The pulse width is decreased when the first time occurs after the target time and increased when the first time occurs before the target time.

A cord correction circuit compensates for the decrease in the output voltage at the plug end of a charger cord caused by the resistance of the charger cord. As current ramps up through the primary winding, a magnetic field is generated that transfers energy to an auxiliary winding and generates a feedback voltage on a node of the auxiliary winding. In one embodiment, the voltage of a cord correction signal is subtracted from the feedback voltage received from the auxiliary winding. A pre-amplifier then compares a reference voltage to the corrected feedback voltage. In another embodiment, the voltage of the cord correction signal is summed with the reference voltage, and the pre-amplifier compares the feedback voltage to the corrected reference voltage. The difference between the voltages on the inverting and non-inverting input leads of the pre-amplifier is used to increase the output voltage at the plug of the flyback converter to compensate for the voltage lost through the charger cord.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 3:
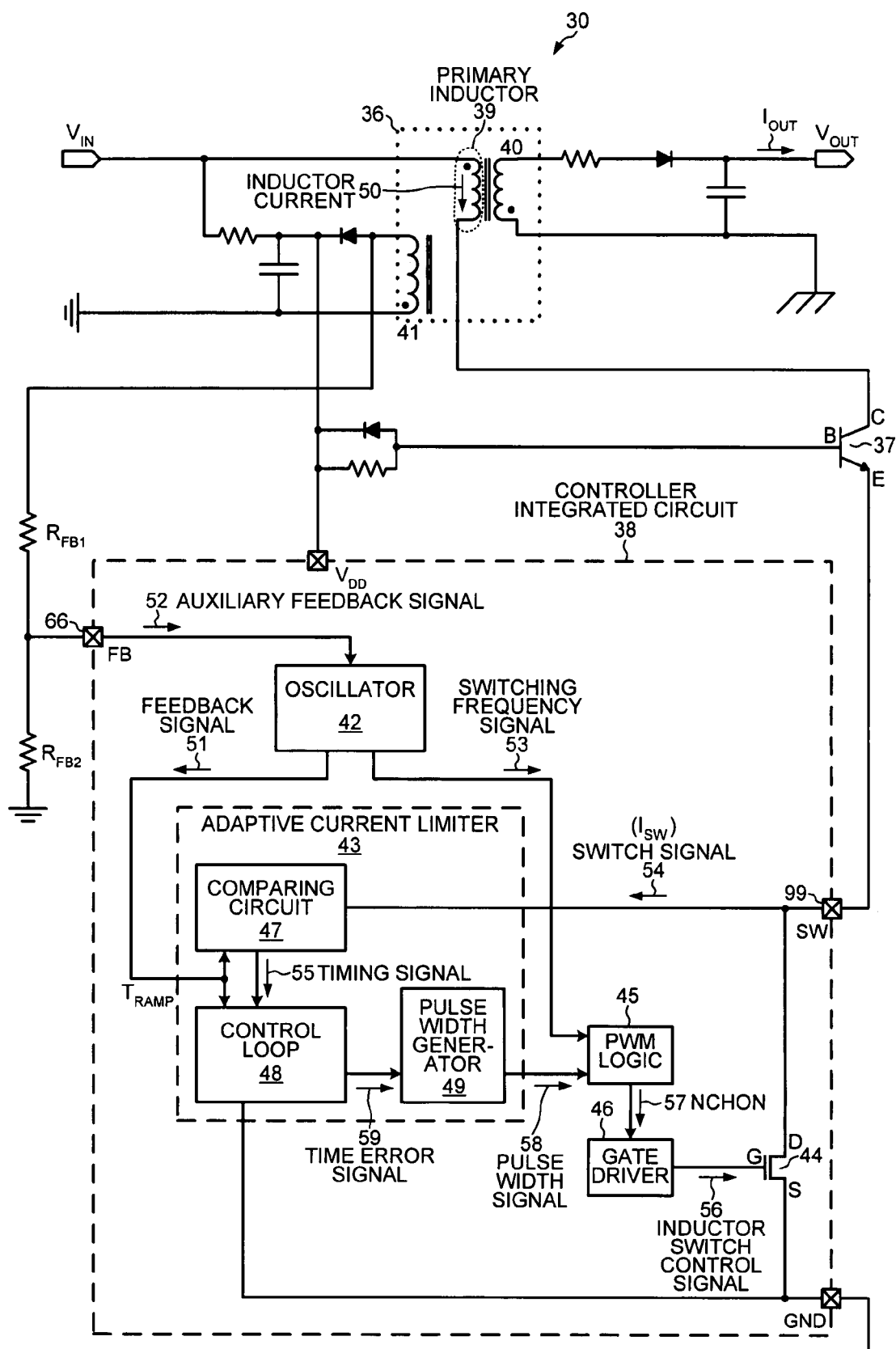
FIG. 3 is a simplified schematic diagram of a flyback converter with a comparing circuit and a control loop in accordance with an embodiment of the invention.
Figure 4:
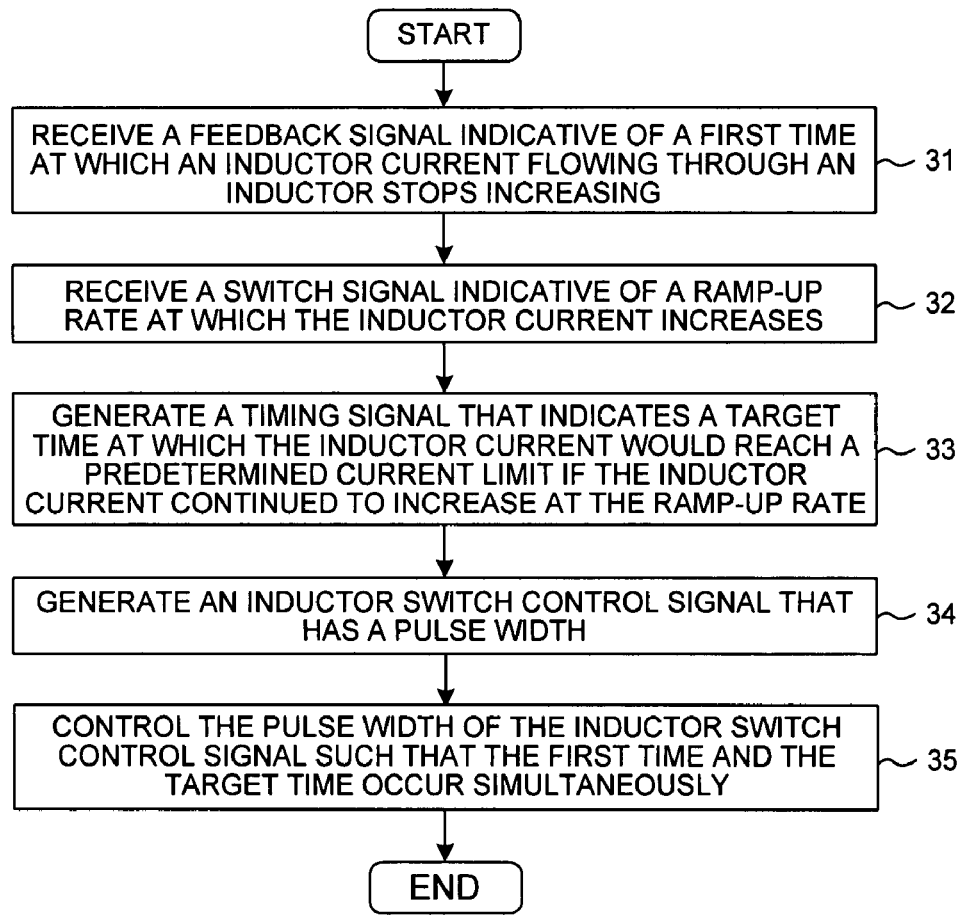
FIG. 4 is a flowchart of a method for controlling the peak current flowing through an inductor of a flyback converter.

FIG. 3 is a diagram of a flyback converter 30 with a comparing circuit and a control loop used to adjust the peak current that flows through an inductor. FIG. 4 is a flowchart illustrating steps 31-35 of a method of operation of the flyback converter 30 of FIG. 3. The method controls the output current of flyback converter 30 by adjusting the peak current that flows through an inductor of the flyback converter 30.

Flyback converter 30 includes a transformer 36, an external NPN bipolar transistor 37, and a controller integrated circuit (IC) 38. Transformer 36 includes a primary winding (inductor) 39, a secondary winding 40 and an auxiliary winding 41. Controller IC 38 includes an oscillator 42, an adaptive current limiter 43, an internal main power switch 44, pulse-width-modulation (PWM) logic 45 and a gate driver 46. Adaptive current limiter 43 includes a comparing circuit 47, a control loop 48 and a pulse width generator 49.

When main power switch 44 is turned on, an inductor current 50 starts flowing through primary inductor 39. As inductor current 50 ramps up through primary inductor 39, a magnetic field is induced that transfers energy to secondary winding 40 when main power switch 44 is turned off. The energy transferred to secondary winding 40 is output from flyback converter 30 as an output current ($I_{OUT}$). In some applications, it is desirable for the output current ($I_{OUT}$) of flyback converter 30 to be maintained at a constant level. The output current ($I_{OUT}$) is dependent on at least three factors: (i) the peak magnitude of inductor current 50, (ii) the inductance ($L_P$) of primary inductor 39, and (iii) the frequency ($f_{OSC}$) at which main power switch 44 is turned on allowing current to ramp up through primary inductor 39. To the extent that the inductance ($L_P$) of primary inductor 39 deviates from a stated nominal magnitude due to variations in the manufacturing processes of transformer 36, the output current ($I_{OUT}$) of individual converters will vary. For example, if the wire that forms the inductor is not of uniform diameter, or if the wire is not wound in a consistent manner, the actual inductance of individual primary inductors will vary. In addition, propagation delays and parasitics in the components that control inductor current 50 using main power switch 44 cause the peak current ($I_P$) through primary inductor 39 to vary. For example, the propagation delays may be process, temperature and voltage dependent.

FIG. 4 describes a method for adjusting the peak current ($I_P$) flowing through primary inductor 39 in order to maintain a constant output current ($I_{OUT}$) from flyback converter 30 despite changes in propagation delays and parasitics that are process, temperature and voltage dependent. In addition, peak current ($I_P$) is adjusted to compensate for non-uniform inductance ($L_P$) of primary inductor 39 due to manufacturing variations. Moreover, a method is described for compensating for non-uniform inductance ($L_P$) by adjusting the frequency ($f_{OSC}$) at which main power switch 44 turns on allowing inductor current 50 to ramp up through primary inductor 39. Thus, output current ($I_{OUT}$) is maintained at a constant magnitude by adjusting either or both the peak inductor current ($I_P$) and the switching frequency ($f_{OSC}$) at which inductor current 50 ramps up through primary inductor 39.

In a first step (step 31), adaptive current limiter 43 receives a feedback signal 51 indicating when inductor current 50 stops increasing in magnitude through primary inductor 39. Both comparing circuit 47 and control loop 48 of adaptive current limiter 43 receive feedback signal 51 from oscillator 42. Inductor current 50 stops ramping up through primary inductor 39 at a first time. Oscillator 42 uses an auxiliary feedback signal 52 to generate feedback signal 51 as well as a switching frequency signal 53. Auxiliary feedback signal 52 is generated using the voltage on a node of auxiliary winding 41. As inductor current 50 ramps up through primary inductor 39, a magnetic field is generated that transfers energy to auxiliary winding 41 and generates the voltage on the node of auxiliary winding 41.

In a second step (step 32), comparing circuit 47 receives a switch signal 54 indicative of a ramp-up rate at which inductor current 50 increases through primary inductor 39. Switch signal 54 is obtained from the emitter of external NPN bipolar transistor 37 via a switch terminal (SW) of controller IC 38. Inductor current 50 which ramps up through primary inductor 39 also flows through NPN bipolar transistor 37 and the switch terminal (SW) of controller IC 38. Although switch signal 54 is derived from the NPN emitter current flowing through main power switch 44 in FIG. 3, other alternative embodiments can be used to generate switch signal 54, for example by using a sense resistor in the source of main power switch 44 or a resistor in the source of a sense MOSFET connected in parallel with main power switch 44.

In a third step (step 33), comparing circuit 47 generates a timing signal 55 that indicates a target time at which inductor current 50 would reach a predetermined current limit if inductor current 50 continued to increase at the ramp-up rate.

In a fourth step (step 34), controller IC 38 generates an inductor switch control signal 56 that has a pulse width. Inductor switch control signal 56 controls the gate of main power switch 44, through which inductor current 50 flows. Gate driver 46 generates inductor switch control signal 56 using an "N-channel on" (Nchon) signal 57. PWM logic 45 generates the N-channel on signal 57 using the switching frequency signal 53 received from oscillator 42 and a pulse width signal 58 received from pulse width generator 49. Switching frequency signal 53 provides the frequency of the pulses of inductor switch control signal 56, and pulse width signal 58 provides the duration of the pulse width of inductor switch control signal 56. Pulse width generator 49 generates pulse width signal 58 using a time error signal 59 received from control loop 48.

In a fifth step (step 35), adaptive current limiter 43 controls the pulse width of inductor switch control signal 56 such that the first time (at which inductor current 50 stops increasing through primary inductor 39) and the target time (at which inductor current 50 would reach the predetermined current limit) occur simultaneously. In one embodiment, adaptive current limiter 43 controls the pulse width of inductor switch control signal 56, whereas in another embodiment adaptive current limiter 43 controls the pulse width of pulse width signal 58 or Nchon signal 57. The first time and the target time can be adjusted to occur simultaneously by controlling the pulse width of any of pulse width signal 58, Nchon signal 57 or inductor switch control signal 56. By adaptively controlling the pulse width, the peak inductor current ($I_P$) is adjusted so as to maintain a constant output current ($I_{OUT}$) of flyback converter 30.

Figure 5:
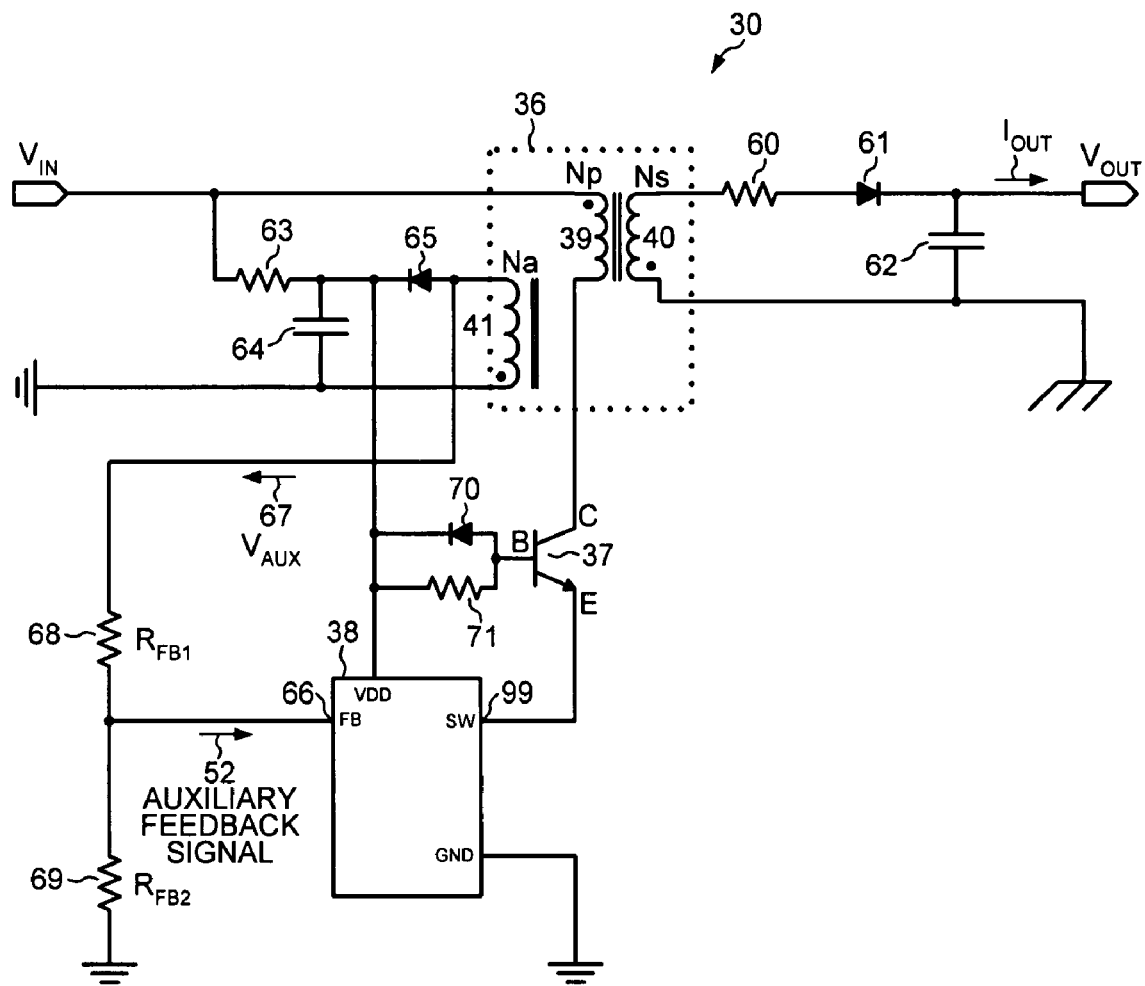
FIG. 5 is a simplified schematic diagram of a constant output current and voltage flyback converter controlled by the primary side, including a pulse width modulation controller integrated circuit.

FIG. 5 is a higher level diagram of flyback converter 30 of FIG. 3. Flyback converter 30 is an accurate and yet low-cost power supply converter that is controlled from the primary transformer side and whose output current is regulated. FIG. 5 shows that flyback converter 30 has no secondary side control circuit and no optical coupler, as are present in the described prior art. The only feedback from the secondary side used by flyback converter 30 to control the output current and voltage is feedback from the magnetic coupling of auxiliary winding 41 and secondary winding 40. In addition to saving cost, the lower component count resulting from the lack of a secondary side control circuit and optical coupler improves the reliability of flyback converter 30.

Two factors that affect the accuracy of regulating the output current of flyback converter 30 are: (a) the variation in the primary inductor winding 39 of transformer 36, and (b) the inaccuracy in detecting of the peak current ($I_P$) of primary inductor 39. The actual inductance ($L_P$) of the primary magnetic inductor typically varies by about ±20%. The peak current ($I_P$) of the primary magnetic inductor is typically not accurately detected because of propagation delays in current sense comparators, PWM logic, gate drivers in controller ICs, because of turn-off delays of the primary power switch, and because of parasitics associated with the drain, in the case of MOSFETs, or the collector, in the case of NPN transistors, of the primary power switch. In addition, the accuracy of peak current detection is reduced by variations in temperature, voltage, IC process, PCB layout, and external-component value-dependent parasitic sources. Flyback converter 30 compensates for the deviations from a stated nominal magnitude of the inductance of the primary inductor by varying the oscillator frequency ($f_{OSC}$) of main power switch 44 inversely to the deviation in the inductance ($L_P$). Flyback converter 30 compensates for the propagation delay and parasitics that make peak current detection difficult by detecting and controlling the peak current of primary magnetic inductor 39 using adaptive current limiter 43 with control loop 48. Moreover, flyback converter 30 is implemented in an emitter switching configuration with primary-side control in order to reduce cost.

Flyback converter 30 of FIG. 5 outputs a constant current and voltage by operating in two modes: a constant (peak) current mode and a constant-voltage mode. Primary winding 39 of transformer 36 has Np turns; secondary winding 40 has Ns turns; and auxiliary winding 41 has Na turns. FIG. 5 shows a secondary side resistor 60 that represents the resistive loss of the copper windings of transformer 36. Flyback converter 30 has a secondary-side rectifier 61, an output capacitor 62, and controller IC 38. Controller IC 38 is a peak-current-mode pulse width modulation (PWM) controller. The initial start-up energy for controller IC 38 is provided by a resistor 63 and a capacitor 64. Once flyback converter 30 is stable, auxiliary winding 41 of transformer 36 powers controller IC 38 via a rectifier 65.

A feedback bond pad FB 66 of controller IC 38 on the primary side of transformer 36 receives an indication of the output voltage ($V_{OUT}$) of secondary winding 40. Auxiliary feedback signal 52 on feedback bond pad FB 66 is obtained by passing the voltage ($V_{AUX}$) 67 on a node of auxiliary winding 41 through a voltage divider resistor network that includes a first feedback resistor ($R_{FB1}$) 68 and a second feedback resistor ($R_{FB2}$) 69. Auxiliary feedback signal 52 is also used to compute the on-time and the actual ramp-up time of the primary inductor.

The embodiment of flyback converter 30 shown in FIG. 5 is used in applications requiring higher output power or higher switching frequency and uses external power-handling components, such as NPN bipolar transistor 37. The base of NPN bipolar transistor 37 is coupled to a diode 70 and a resistor 71. Other embodiments of flyback converter 30 that are used in low-power applications have no external bipolar transistor, MOSFET power switch or current sense circuit, all of which can be integrated into the integrated circuit 38.

NPN bipolar transistor 37 cooperates with controller IC 38 in an emitter switching configuration as shown in the FIG. 5. External NPN bipolar transistor 37 acts as a switch to primary winding 39. In this configuration, an internal circuit in controller IC 38 drives the emitter of external bipolar transistor 37. In other embodiments, to further increase the power handling capability and switching frequency, an external MOSFET is used as the main switch instead of bipolar transistor 37. Generally, the frequency capability of bipolar transistor 37 is limited by the NPN base charge/discharge time, and the high power capability of bipolar transistor 37 is limited by the base drive resistor. Thus, using bipolar transistor 37 is appropriate for applications that do not require very high power or switching frequency.

Using a sense resistor to detect the peak current of the primary inductor, as done in the prior art, would be impractical because the current in the sense resistor of the prior art would be equal to the NPN emitter current, which is comprised of both the actual inductor current flowing in the collector as well as the base current of bipolar transistor 37. Despite this complication, using an NPN transistor instead of a MOSFET is desirable because the cost of a bipolar transistor is typically much lower than that of a high voltage MOSFET, even though the bipolar transistor contributes additional significant error terms that depend on transistor characteristics, such as current gain (Beta) and saturation effects. Current gain and saturation are difficult to control and vary considerably over process, temperature, voltage, and external component value changes.

Figure 6:
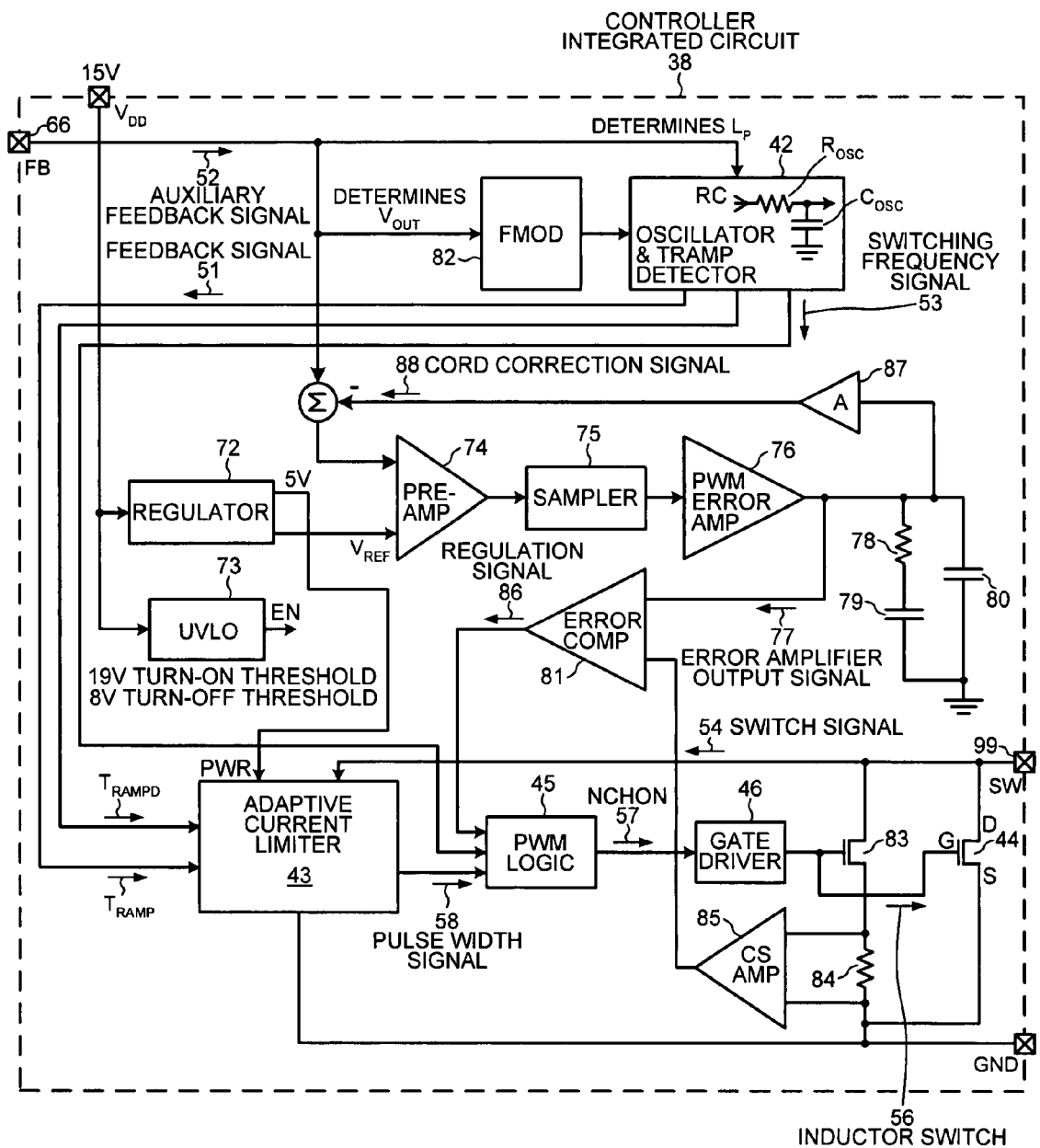
FIG. 6 is a more detailed schematic diagram of the pulse width modulation controller integrated circuit of FIG. 5, including an oscillator and an adaptive current limiter.

FIG. 6 shows controller IC 38 in more detail. Controller IC 38 includes adaptive current limiter 43 that compensates for control error in the detection of the peak current ($I_P$) of primary inductor 39. Adaptive current limiter 43 is a low-cost solution to correcting errors in peak current detection and does not substantially compromise performance.

Adaptive current limiter 43 is used to make the peak current ($I_P$) of primary inductor 39 constant despite all system variations. The turn-off of internal power MOSFET 44 is adjusted using control loop 48 such that the total ramp-up time ($T_{RAMP}$) of primary inductor 39 corresponds precisely to the time required for primary inductor 39 to ramp-up to a predetermined peak current limit ($I_{LIM}$). The total ramp-up time ($T_{RAMP}$) includes: (a) the internal on-time of main power switch 44, (b) the base discharge time of bipolar transistor 37, and (c) the collector rise time of bipolar transistor 37. The total ramp-up time ($T_{RAMP}$) is forced to equal twice the time it takes to ramp-up to exactly half of the limit ($I_{LIM}$) of the peak current flowing through primary winding 39. Although the ratio 2:1 is used in this example, in other embodiments other ratios can also be used. In many practical applications, the 2:1 ratio performs reasonably well, considering accuracy and real world implementation details (e.g., device layout matching). Other suitable ratios, such as 3:1, can be used depending upon the needs of the particular application. Control loop 48 adaptively drives the actual ramp-up time ($T_{RAMP}$) of primary inductor 39 to be equal to a reference time.

There are many alternate applications where the peak inductor current does not need to be held substantially constant despite all system variations. One application of AC/DC power supply converters and adapters that does not require substantially constant peak inductor current is the limiting of output current or power to protect against fault conditions. Such an application does not necessarily need to regulate output current to a very high accuracy, as do AC/DC off-line chargers.

A regulator 72 provides an internal power supply and a reference voltage $V_{REF}$ to controller IC 38. In one embodiment, regulator 72 receives a fifteen-volt VDD voltage generated during startup by resistor 63 and capacitor 64 and sustained after startup by auxiliary winding 41 and rectifier 65, and outputs a five-volt power signal that is received by adaptive current limiter 43. An under-voltage lockout circuit (UVLO) 73 monitors the VDD voltage supplied to controller IC 38 and enables the normal operation of controller IC 38 when VDD reaches the under-voltage lockout turn-on threshold. In this example, the under-voltage lockout turn-on threshold is nineteen volts, and the under-voltage lockout turn-off threshold is eight volts. If VDD drops to the under-voltage lockout turn-off threshold, then controller IC 38 is disabled. An indication of the output voltage of secondary winding 40 of transformer 36 is fed back via auxiliary winding 41 and feedback bond pad FB 66 to controller IC 38. Auxiliary feedback signal 52 is compared to the reference voltage $V_{REF}$ generated by regulator 72 to produce an error signal, which is amplified by a pre-amplifier 74, sampled by a sampler 75, and fed to a PWM error amplifier 76, which further amplifies the error signal. A twice amplified error signal 77 is output by error amplifier 76. An internal compensation network for error amplifier 76 is formed by a resistor 78 and the capacitors 79 and 80. An error comparator 81 receives error amplifier output signal 77 and serves as a pulse-width modulation comparator for the constant-voltage mode of flyback converter 30.

In addition to pre-amplifier 74, both oscillator and $T_{RAMP}$ detector 42 and a frequency modulator (FMOD) 82 receive auxiliary feedback signal 52 from feedback bond pad FB 66. FMOD 82 senses the voltage of auxiliary feedback signal 52 and generates a bias current for oscillator and $T_{RAMP}$ detector 42. The bias current output by FMOD 82 varies with the voltage of auxiliary feedback signal 52, thereby adjusting the oscillator frequency ($f_{OSC}$) as the output voltage ($V_{OUT}$) of flyback converter 30 changes in order to maintain a constant output current. Oscillator 42 includes a $T_{RAMP}$ detection circuit that detects the actual time that the current in primary inductor 39 is ramping up ($T_{RAMP}$). The $T_{RAMP}$ detection circuit determines the total ramp-up time based on the voltage waveform ($V_{AUX}$) 67 of auxiliary winding 41 that is divided by the voltage divider of resistors 68 and 69. Oscillator 42 generates the frequency for the pulse-width modulation that drives main power switch 44.

The voltage of auxiliary feedback signal 52 depends on the ratio of the inductance of auxiliary inductor 41 to that of primary inductor 39 and secondary inductor 40 and is used as the reference voltage for oscillator 42. Thus, in addition to peak current ($I_P$) the oscillator frequency ($f_{OSC}$) also compensates for variations in the inductance of primary inductor 39. In addition to the embodiment of FIG. 6, other alternate topologies may be used to modify the characteristics of oscillator 42 in order to compensate for variations in the primary inductance of transformer 36.

PWM logic circuit 45 generates the desired pulse-width modulation waveform by utilizing: (a) current-mode PWM control when regulating output voltage, and (b) cycle-by-cycle adaptive current limiting when regulating output current. The Nchon signal 57 output by PWM logic 45 is received by gate driver 46. Gate driver 46 is a relatively high-speed MOSFET gate driver. The inductor switch control signal 56 output by gate driver 46 is received by main power switch 44, as well as by a smaller scaled internal MOSFET 83. The smaller internal MOSFET 83 and a resistor 84 form a current sense circuit. The sensed current is amplified by a current sense amplifier 85 and is converted to a voltage signal. The voltage signal is compared by error comparator 81 to error amplifier output signal 77 output by PWM error amplifier 76. Error comparator 81 outputs a regulation signal 86 that is used to set the on-time of main power switch 44. In the constant-voltage mode of operation when the output current of flyback converter 30 is less than the maximum output current limit, regulation signal 86 is used to regulate a constant output voltage. In the constant-current mode of operation, output current regulation is maintained by adaptive current limiter 43 limiting the peak current ($I_P$) of primary inductor 39 when the output current ($I_{OUT}$) reaches a predetermined current limit ($I_{LIM}$). Adaptive current limiter 43 limits the peak current independent of temperature, input line voltage, IC and external component tolerance changes, and PCB layout variations.

Cord correction circuit 87 receives error amplifier output signal 77 and generates a cord correction signal 88 whose voltage is proportional to that of error amplifier output signal 77. Cord correction signal 88 is used to adjust the voltage of auxiliary feedback signal 52 to compensate for the loss of output voltage caused by the series resistance of the charger cord of flyback converter 30. Cord resistance compensation provides a reasonably accurate constant voltage at the end of the cord that connects flyback converter 30 to the device that is to be charged or powered, such as a cell phone or a portable media player. Output voltage is lost because the voltage at the point of load will have an I·R drop due to the finite series resistance of the cord multiplied by the output current of the power supply. Primary-side-controlled flyback power converter 30 relies on the reflected feedback voltage across transformer 36 from secondary winding 40 to auxiliary winding 41 to regulate the output voltage ($V^{OUT}$), but this reflected voltage does not include the I·R voltage drop error resulting from the finite cord resistance. In the constant-voltage mode of operation, the output of error amplifier 76 is proportional to the output current of flyback converter 30. Therefore, error amplifier output signal 77 can be used to produce cord correction signal 88 whose voltage is proportional to output current and which can be applied either to the feedback input or to the reference voltage input of pre-amplifier 74 to compensate for cord resistance. In the embodiment of FIG. 6, the correction is applied to the feedback input of pre-amplifier 74, but the correction can be similarly applied to the reference voltage input in alternate embodiments.

Figure 7:
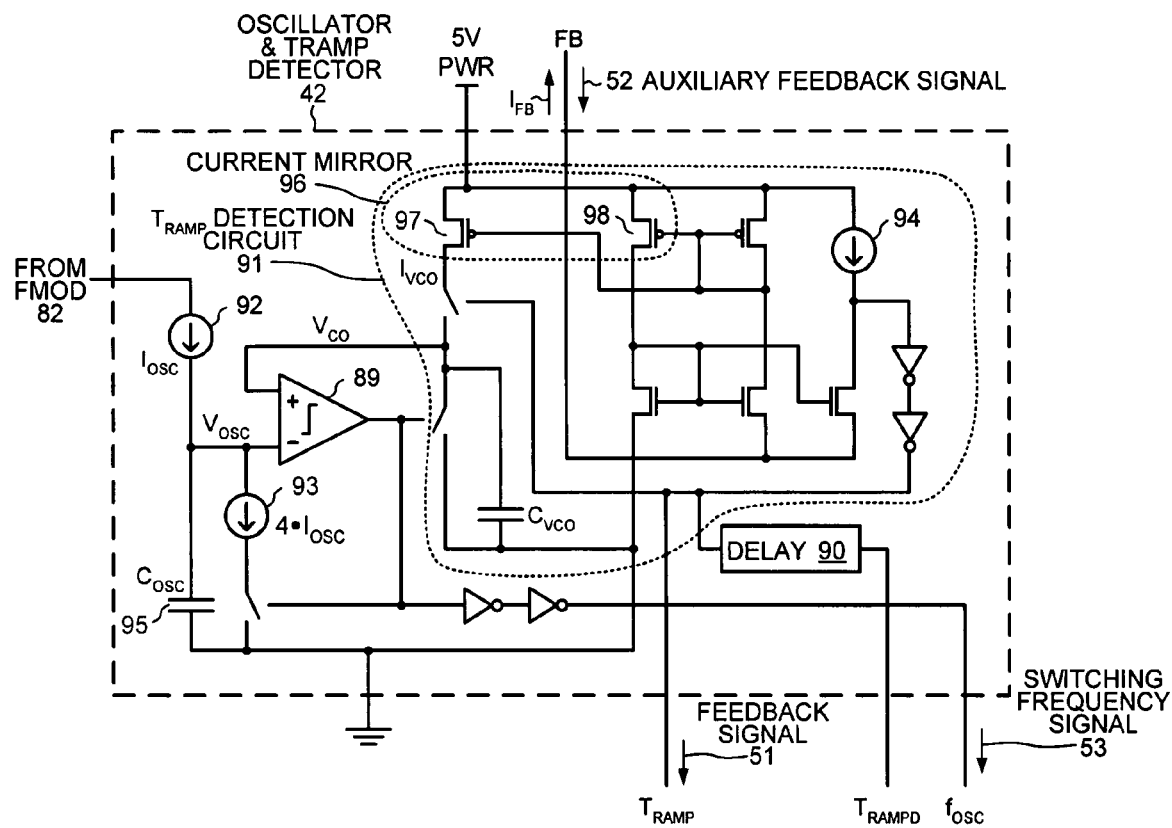
FIG. 7 is a more detailed schematic diagram of the oscillator of FIG. 6.

FIG. 7 shows oscillator and $T_{RAMP}$ detector 42 of controller IC 38 in more detail. Oscillator 42 includes voltage comparator 89, a delay element 90, a $T_{RAMP}$ detection circuit 91, three current sources 92, 93 and 94, and an oscillator capacitor $C_{OSC}$ 95. $T_{RAMP}$ detection circuit 91 determines the total ramp-up time using auxiliary feedback signal 52, which provides an indication of the voltage waveform ($V_{AUX}$) 67 of auxiliary winding 41 that is divided by the voltage divider of resistors 68 and 69. $T_{RAMP}$ detection circuit 91 generates feedback signal ($T_{RAMP}$) 51. Delay element 90 receives feedback signal ($T_{RAMP}$) 51 and generates the delayed signal $T_{RAMPD}$. The delayed signal $T_{RAMPD}$ is asserted at a delay $T_{D2}$ from when feedback signal ($T_{RAMP}$) 51 is asserted. $T_{RAMP}$ detection circuit 91 includes a current mirror 96 formed by p-channel FETs 97 and 98. When main power switch 44 is on and inductor current 50 is ramping up in primary inductor 39, oscillator 42 generates a voltage-controlled-oscillator current $I_{VCO}$ using current mirror 96. The magnitude of voltage-controlled-oscillator current $I_{VCO}$ is expressed as:

$$I_{VCO} = M \cdot \frac{V_{AUX}}{R_{FB1}} = M \cdot \frac{V_{IN} \cdot \frac{Na}{Np}}{R_{FB1}}, \qquad (1)$$

where M is the gain of current mirror 96. In one embodiment, the gain M is one, and $I_{VCO}$ equals the feedback current $I_{FB}$ flowing back through feedback bond pad FB 66.

Figure 9:
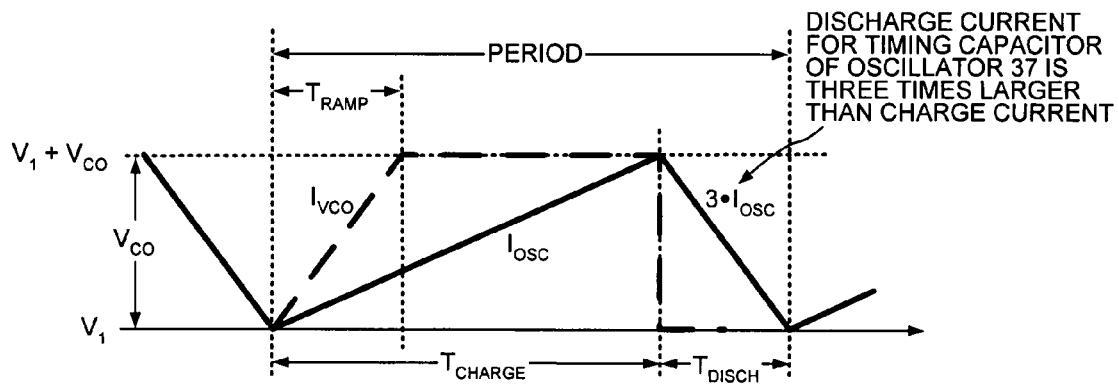
FIG. 9 is a waveform diagram showing idealized timing waveforms of the oscillator in FIG. 6.

Oscillator capacitor $C_{OSC}$ 95 is charged with a charge current $I_{OSC}$ generated by current source 92. In this embodiment, oscillator capacitor $C_{OSC}$ 95 is discharged by current source 93 at a discharge current that is four times as large as the charge current. Because charging current source 92 is not turned off when discharging current source 93 is turned on, the discharging current is three times as large as the charging current, as shown in FIG. 9. FMOD 82 generates a bias current with a voltage that is proportional to the voltage of auxiliary feedback signal 52 when main power switch 44 is off. Current source 92 receives the bias current. Oscillator 42 is powered by a five-volt power signal generated by regulator 72.

In one embodiment, oscillator 42 is an I:3I oscillator as shown in FIGS. 7 and 9. In another embodiment, oscillator 42 is an internal RC oscillator and generates switching frequency signal 53, whose frequency $f_{OSC}$ is dependent on the capacitance of oscillator capacitor $C_{OSC}$ and the oscillator resistance $R_{OSC}$. The oscillator resistance can be expressed as $R_{OSC}=V_{FB}/I_{OSC}$, where $V_{FB}=V_{OUT}\cdot Na/Ns$. PWM logic 45 receives switching frequency signal 53 from oscillator 42. PWM logic 45 then uses switching frequency signal 53 and pulse width signal 58 received from pulse width generator 49 to generate the Nchon signal 57. The frequency $f_{OSC}$ of switching frequency signal 53 determines how often pulses of Nchon signal 57 occur.

Figure 8:
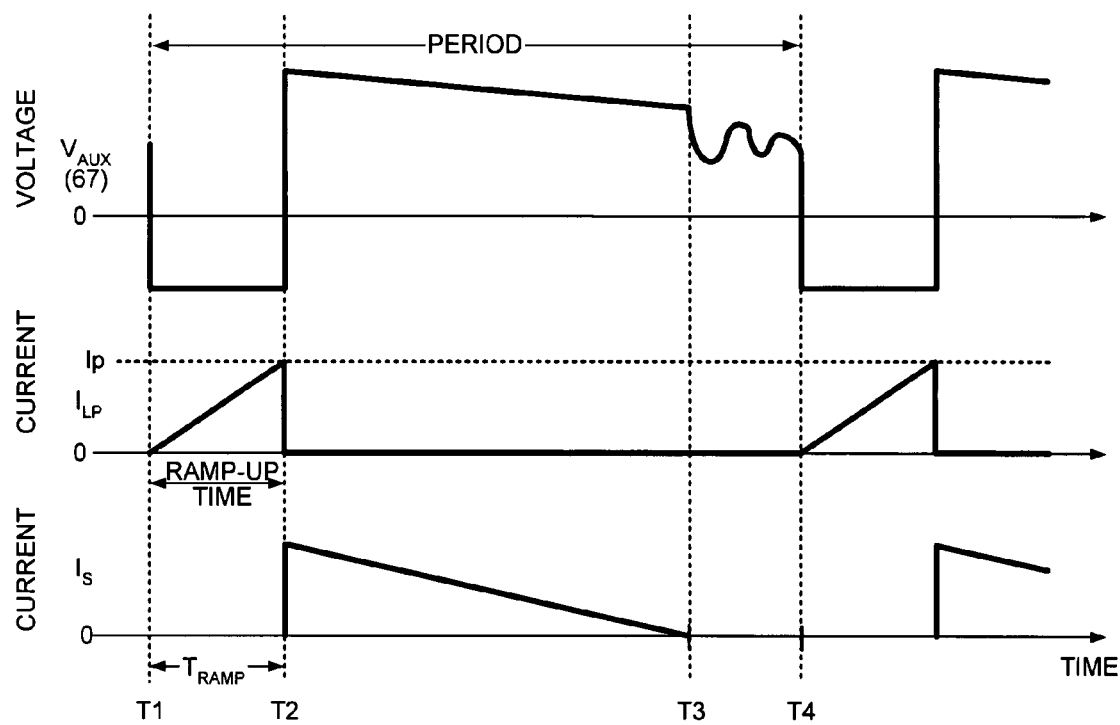
FIG. 8 is a waveform diagram illustrating idealized waveforms of the auxiliary winding voltage, the primary switch current and the secondary rectifier current operating in Discontinuous Conduction Mode (DCM).

FIG. 8 shows idealized waveforms of the voltage ($V_{AUX}$) 67 on a node of auxiliary winding 41, the current ($I_{LP}$) through primary winding 39, and the current ($I_S$) through the secondary winding as reflected by the current through secondary-side rectifier 61 operating in discontinuous conduction mode (DCM). Main power switch 44 turns on at T1, turns off at T2, and turns on again at T4. Thus, the time between T1 and T4 is the switching period. The time between T1 and T2 is the ramp-up time ($T_{RAMP}$) during which main power switch 44 is turned on. The time between T2 and T4 is the time during which main power switch 44 is turned off. The current waveform ($I_S$) shows that the current through secondary winding 40 of transformer 36 discharges to zero by T3.

Feedback signal 51 (also referred to as the voltage waveform $T_{RAMP}$) reflects the actual ramp-up time of primary inductor 39, which is detected by oscillator and $T_{RAMP}$ detector 42 based on the voltage ($V_{AUX}$) 67 on a node of auxiliary winding 41. The voltage of auxiliary feedback signal 52 on feedback bond pad FB 66 provides oscillator 42 with an indication of the voltage ($V_{AUX}$) 67 across the auxiliary winding. The current through the primary inductor ($I_{LP}$) begins to rise, as shown in FIG. 8, when the voltage waveform ($V_{AUX}$) 67 goes negative and the feedback signal 51 (voltage waveform $T_{RAMP}$) goes high. When the primary inductor current ($I_{LP}$) reaches its peak ($I_P$) and the voltage across the auxiliary winding ($V_{AUX}$) flies up, oscillator 42 detects the end of the ramp-up time $T_{RAMP}$.

The output power of flyback converter 30 generally depends only on the stored energy of primary inductor 39 in discontinuous conduction mode (DCM) according to an equation (2), which neglects efficiency losses:

$$P_{OUT}=(V_{OUT}+V_D)\cdot I_{OUT}=\tfrac{1}{2}\cdot I_P^2\cdot L_P\cdot f_{OSC} \qquad (2)$$

where $V_D$ is the voltage drop across secondary side rectifier 61, $L_P$ is the inductance of primary winding 39, $I_P$ is the peak current of primary inductor 39, and $f_{OSC}$ is the switching frequency as set by oscillator 42 of controller IC 38. Thus, the current output from flyback converter 30, neglecting efficiency losses, is expressed as:

$$I_{OUT}=\frac{\tfrac{1}{2}\cdot I_P^2\cdot L_P\cdot f_{OSC}}{V_{OUT}+V_D}. \qquad (3)$$

The output voltage $V_{OUT}$ of flyback converter 30 is the nominal regulation voltage when $I_{OUT}$ is less than the limit ($I_{LIM}$) of the peak current ($I_P$) flowing through primary winding 39. The magnitude of the peak current limit ($I_{LIM}$) is pre-determined before flyback converter 30 enters the operating mode. In the constant-output-current operating mode, the output voltage $V_{OUT}$ of flyback converter 30 drops from its nominal regulation voltage to zero as the output current attempts to increase above the desired constant output current. To keep $I_{OUT}$ constant, the switching frequency ($f_{OSC}$) of oscillator 42 is preferably reduced proportionately to the voltage ($V_{OUT}+V_D$) while maintaining a fixed peak current ($I_P$) of primary inductor 39. Due to variations in the peak current ($I_P$), however, the switching frequency ($f_{OSC}$) is also preferably varied inversely proportionately to the peak current ($I_P$) in order to maintain a constant output current ($I_{OUT}$).

FIG. 9 illustrates how the inductance ($L_P$) of primary winding 39 is dynamically measured to enable the switching frequency ($f_{OSC}$) to be varied to maintain a constant output current ($I_{OUT}$) despite variations in the primary inductance ($L_P$). FIG. 9 is described in relation to the various equations below. In addition, a method is described for producing a switching frequency ($f_{OSC}$) that varies inversely with a change in the inductance ($L_P$) of primary winding 39.

The final result of the method for producing the switching frequency ($f_{OSC}$) is described in Equation 11. Some of the waveforms illustrated in FIG. 9 are idealized timing waveforms generated by oscillator 42 of controller IC 38. The ramp voltages are developed through current source charging/discharging timing capacitors. The charge current for a timing capacitor $C_{OSC}$ in oscillator 42 is:

$$I_{OSC}=\frac{V_{FB}}{R_{OSC}}=\frac{V_{OUT}+V_D}{R_{OSC}}\cdot\frac{Na}{Ns}\cdot\frac{R_{FB2}}{R_{FB1}+R_{FB2}} \qquad (4)$$

where, as shown in FIG. 5, Na is the number of turns of auxiliary winding 41, Ns is the number of turns of secondary winding 40, $R_{FB1}$ and $R_{FB2}$ are the resistances of feedback resistors 68 and 69, respectively, $R_{OSC}$ is the resistance of an internal IC resistor in oscillator 42 used to produce the current $I_{OSC}$, and $V_{FB}$ is the voltage of auxiliary feedback signal 52 present on feedback bond pad FB 66. The voltage $V_{FB}$ on feedback bond pad FB 66 is: (a) obtained from the feedback voltage ($V_{AUX}$) 67 and is equal to ($V_{OUT}\cdot Na/Ns)\cdot[R_{FB2}/(R_{FB1}+R_{FB2})]$ when main power switch 44 is off and the current through secondary winding 40 is greater than zero, and (b) close to zero volts when main power switch 44 is on and controller IC 38 actively controls the voltage $V_{FB}$. In this embodiment, the discharge current for the oscillator timing capacitor $C_{OSC}$ is chosen to be three times larger than the charge current $I_{OSC}$, as shown in FIG. 9. Other ratios are used in other embodiments. Note that the discharge current source 93 is four times larger than the charge current source 92 in FIG. 7 in order to achieve the 3:1 ratio. The oscillator frequency ($f_{OSC}$) is described by the equation:

$$f_{OSC}=\frac{1}{T}=\frac{1}{Tch+Tdisch}=\frac{3}{4}\cdot\frac{I_{OSC}}{C_{OSC}\cdot V_{CO}}. \qquad (5)$$

The term $V_{CO}$ is obtained from another timing capacitor $C_{VCO}$ and the charge current $I_{FB}$. When main power switch 44 is on, the voltage of auxiliary feedback signal 52 present on feedback bond pad FB 66 is driven close to zero by controller IC 38. Moreover, FIG. 8 shows that when main power switch 44 is on, the voltage ($V_{AUX}$) 67 across auxiliary winding 41 is negative and equal to $$V_{AUX} = -V_{IN} \cdot \frac{Na}{Np}. \tag{6}$$

$$\text{Hence, } I_{FB} = \frac{V_{FB} - V_{AUX}}{R_{FB1}} = \frac{V_{IN}}{R_{FB1}} \cdot \frac{Na}{Np}, \tag{7}$$

$$\text{and } V_{CO} = \frac{V_{IN}}{R_{FB1}} \cdot \frac{Na}{Np} \cdot \frac{T_{RAMP}}{C_{VCO}}. \tag{8}$$

Thus, the frequency output by oscillator 42 can be expressed by combining equations (4), (5) and (8), resulting in equation (9):

$$f_{OSC} = \frac{3}{4} \cdot \frac{V_{OUT} + V_D}{V_{IN} \cdot T_{RAMP}} \cdot \frac{Np}{Ns} \cdot \frac{C_{VCO}}{C_{OSC}} \cdot \frac{R_{FB1}}{R_{OSC}} \cdot \frac{R_{FB2}}{R_{FB1} + R_{FB2}}. \tag{9}$$

The volt-second of the primary inductor can be expressed as $$V_{IN} \cdot T_{RAMP} = L_P \cdot I_P, \tag{10}$$

leading to the final expression for the switching frequency ($f_{OSC}$) generated by oscillator 42, $$f_{OSC} = \frac{3}{4} \cdot \frac{V_{OUT} + V_D}{L_P \cdot I_P} \cdot \frac{Np}{Ns} \cdot \frac{C_{VCO}}{C_{OSC}} \cdot \frac{R_{FB1}}{R_{OSC}} \cdot \frac{R_{FB2}}{R_{FB1} + R_{FB2}}, \tag{11}$$

$$\text{or } f_{OSC} = K \cdot \frac{V_{OUT} + V_D}{L_P \cdot I_P}, \tag{12}$$

where K is a design constant.

Equation (12) shows that the switching frequency ($f_{OSC}$) generated by oscillator 42 is proportional to the voltage ($V_{OUT}+V_D$) and inversely proportional to the inductance ($L_P$) of primary winding 39. Substituting equation (12) into equation (3) results in $$I_{OUT} = \frac{1}{2} \cdot K \cdot I_P. \tag{13}$$

Equation (13) demonstrates that the current ($I_{OUT}$) output from flyback converter 30 is independent of the inductance ($L_P$) of primary winding 39. Therefore, the disclosed method of adaptively controlling the switching frequency $f_{OSC}$ such that $f_{OSC}$ is inversely proportional to Lp effectively produces a constant output current that does not change with variations in primary inductance.

Figure 1:
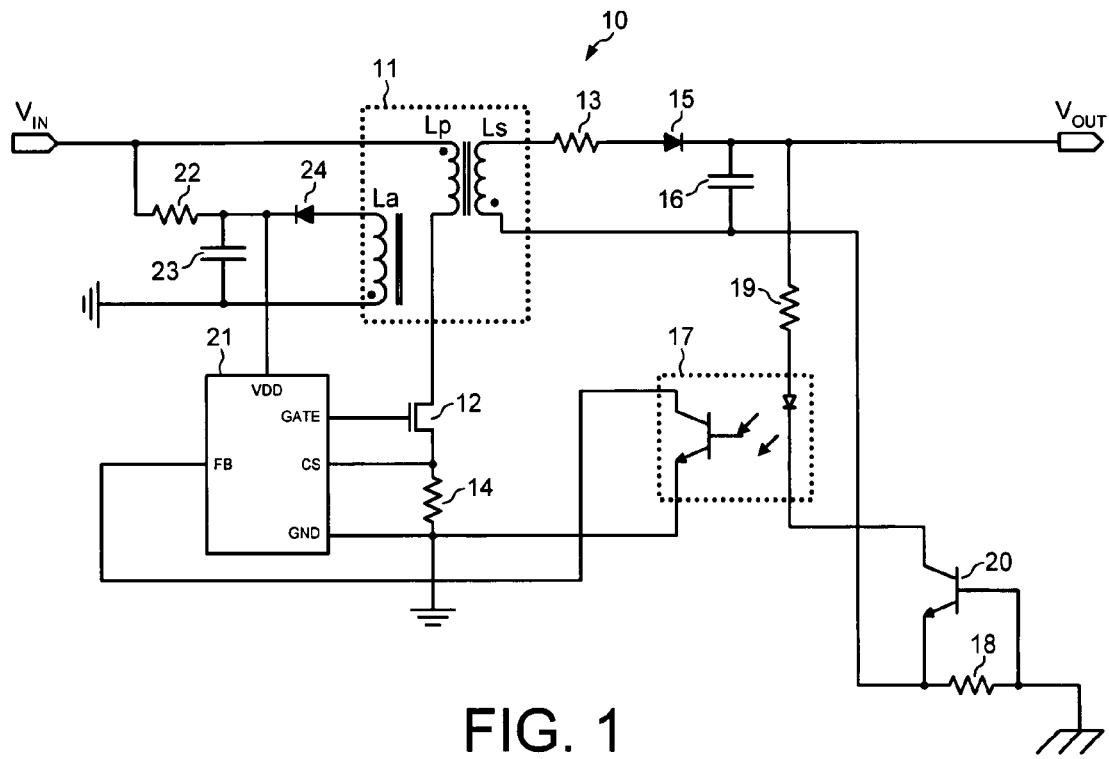
FIG. 1 (prior art) is a simplified schematic diagram of a conventional constant output current flyback converter that is controlled on the secondary side.
Figure 2A:
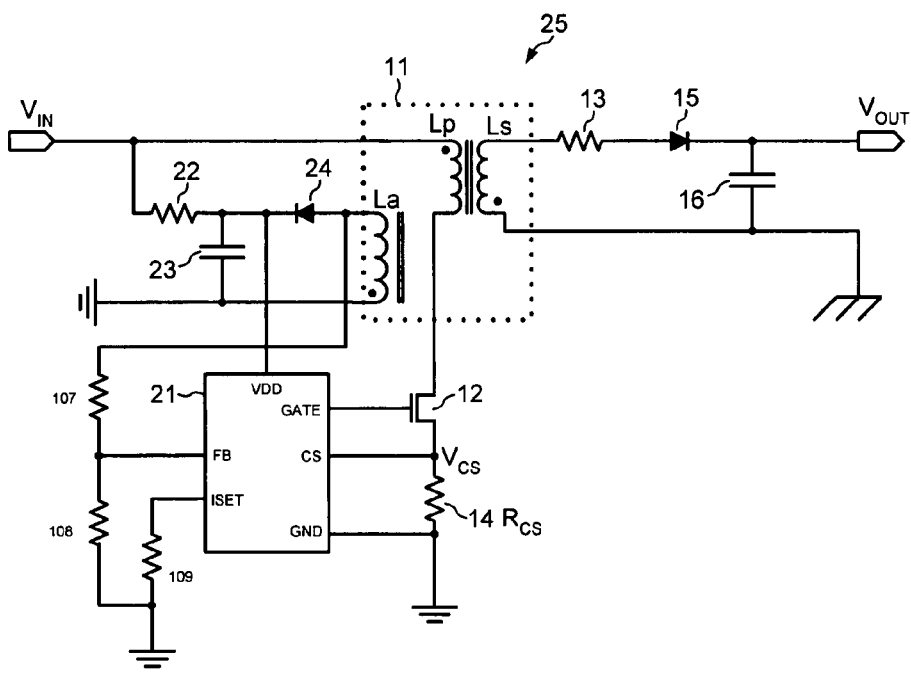
FIG. 2A (prior art) is a simplified schematic diagram of a conventional constant output current flyback converter that is controlled on the primary side.
Figure 2B:
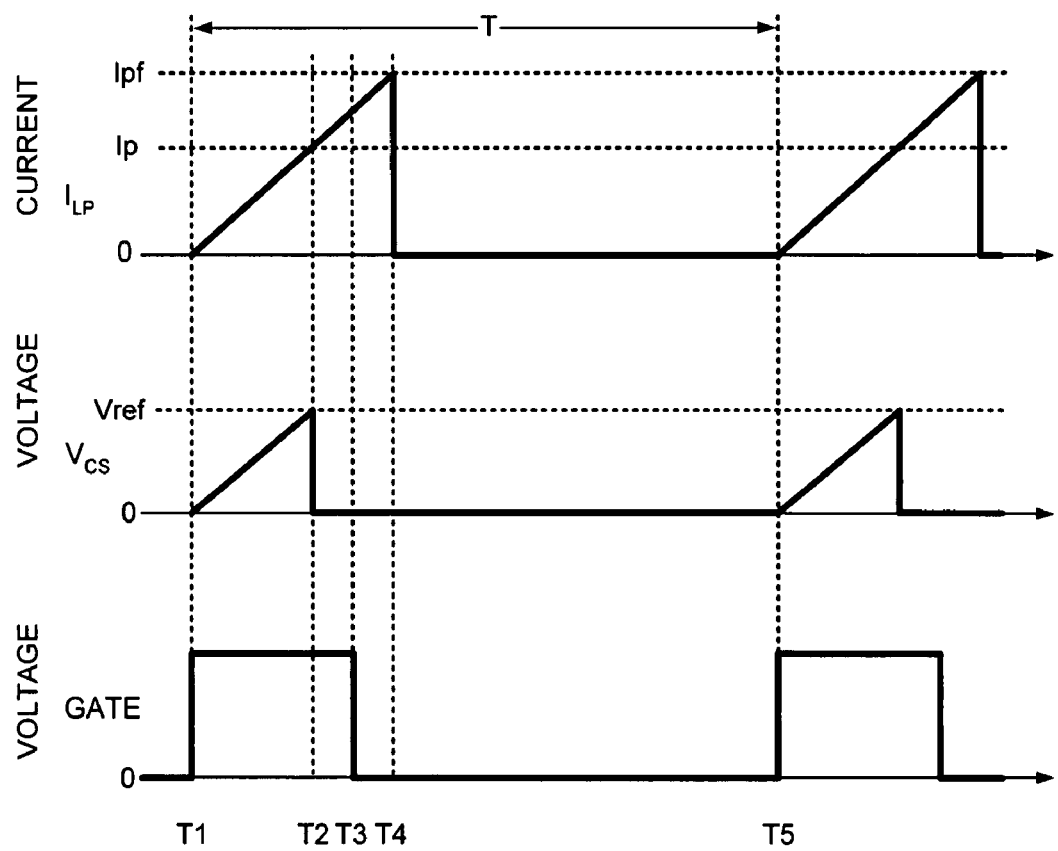
FIG. 2B (prior art) are waveform diagrams illustrating peak current detection errors in the constant output current flyback converter of FIG. 2A.

Equation (13) also demonstrates that an accurate output current ($I_{OUT}$) of flyback converter 30 can be generated by accurately determining the peak current ($I_P$) of the primary inductor. Conventionally, the peak current ($I_P$) of a converter has not been accurately determined. For example, the peak current ($I_P$) of the prior-art converter 25 was set using a constant reference voltage. The constant reference voltage was generated by using an external resistor to divide a voltage derived from a bandgap, as shown in FIG. 2A (prior art). The current sense resistor (RCS) 14 sensed the current from the primary inductor and converted it into a voltage signal that was sensed. When this voltage reached the reference voltage, it triggered a current limit comparator, which reset the PWM logic and turned off the main switch 12. This conventional method of setting the maximum primary inductor current has some inherent errors.

Figure 10:
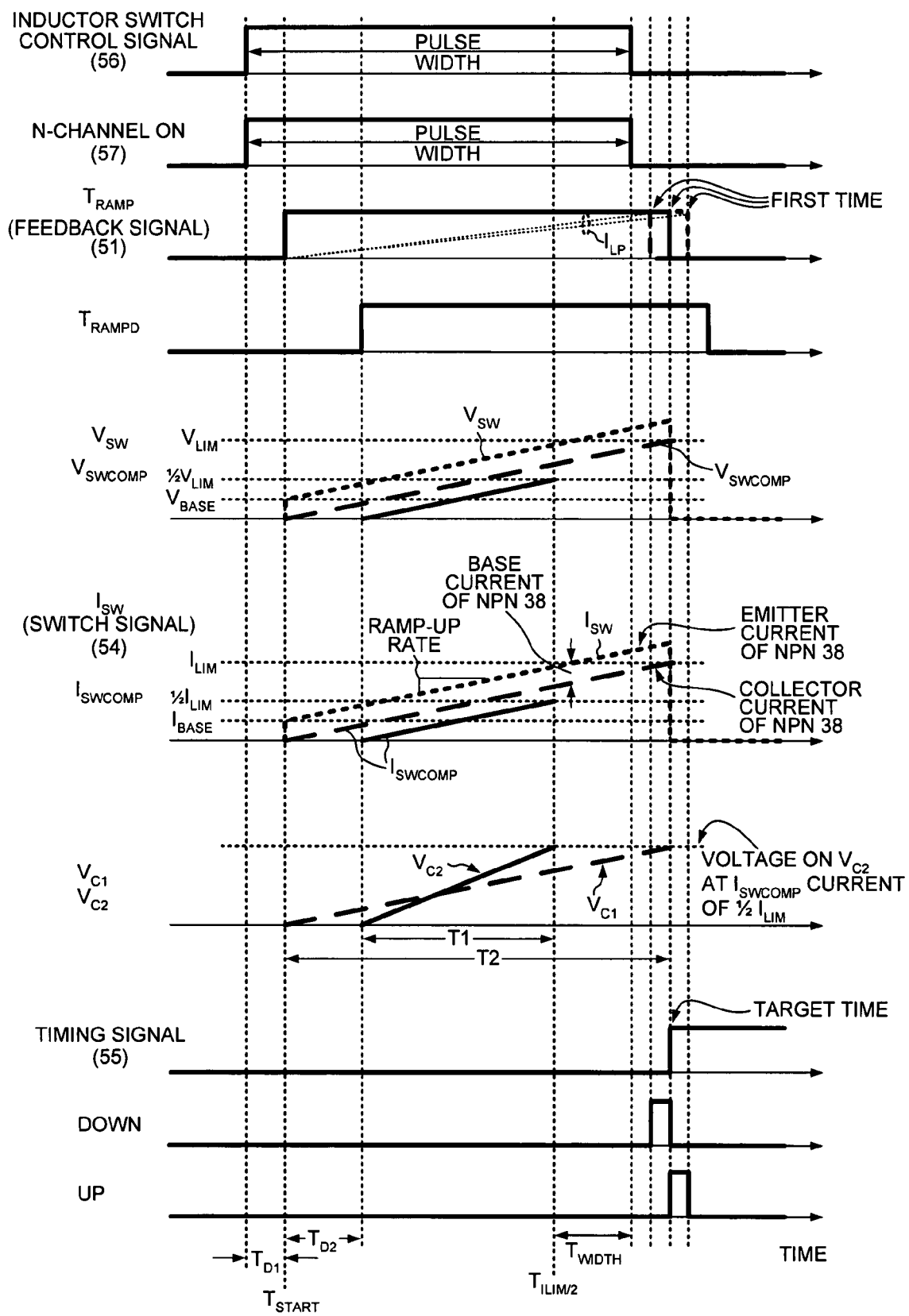
FIG. 10 is a waveform diagram showing the operational and timing waveforms of the adaptive current limiter of FIG. 6.

FIG. 10 shows operational and timing waveforms of control loop 48 of adaptive current limiter 43 of controller IC 38. The "N-channel on" (Nchon) waveform 57 is the on/off gate drive signal to the internal MOSFET that functions as main power switch 44. Switch signal 54 (waveform $I_{SW}$) is the current flowing into a bond pad SW 99 of controller IC 38 from the emitter of external NPN bipolar transistor 37 to the drain of internal main MOSFET switch 44. The voltage waveform $V_{SW}$ is the voltage on bond pad SW 99. The period $T_{D1}$ is the delay time between when Nchon 57 is asserted until the time that the current ($I_{SW}$) 54 through SW bond pad 99 actually begins to ramp up. The delay time ($T_{D1}$) results from the switching delay in turning on external NPN bipolar transistor 37. The current ($I_{SW}$) through SW bond pad 99 is comprised of two component currents: (a) the actual current ($I_{LP}$) through primary inductor 39, which is the current through the collector of external NPN bipolar transistor 37, and (b) the base current of bipolar transistor 37. The base current is an offset current and causes the current ($I_{SW}$) of switch signal 54 to start from a non-zero value, as shown in FIG. 10 by the step in the current ($I_{SW}$) that occurs at the end of the delay time ($T_{D1}$). Besides the base current of bipolar transistor 37, other factors also cause the current waveform ($I_{LP}$) through primary inductor 39 to differ from the current waveform ($I_{SW}$) through SW bond pad 99, such as parasitics associated with the drain of main switch 44 and propagation delays.

When oscillator 42 detects the beginning of the ramp of the inductor current ($I_{LP}$) 50 using auxiliary feedback signal 52, oscillator 42 asserts feedback signal ($T_{RAMP}$) 51. The time when inductor current ($I_{LP}$) 50 stops increasing in magnitude through primary inductor 39 is indicated in FIG. 10 as the "first time". When feedback signal 51 is asserted, a p-channel FET is opened, allowing charge from a first fixed current source ($I_1$) to accumulate on a first timing capacitor C1. The charge on first timing capacitor C1 ramps up at a rate $dV_{C1}/dt = I/C1$. Oscillator 42 also generates a $T_{RAMPD}$ signal, which is a delayed version of feedback signal ($T_{RAMP}$) 51. Oscillator 42 asserts the $T_{RAMPD}$ signal after a second delay time ($T_{D2}$) following the end of the delay time ($T_{D1}$). When the $T_{RAMPD}$ signal is asserted at the end of the second delay period ($T_{D2}$), a second p-channel FET is opened, allowing charge from a second fixed current source ($I_2$) to accumulate on a second timing capacitor C2. In the embodiment of the adaptive current limiter 43 of FIG. 6, second timing capacitor C2 is half the size of first timing capacitor C1. In an alternative embodiment, first capacitor C1 and second capacitor C2 are the same size, and second fixed current source ($I_2$) generates twice the current of first fixed current source ($I_1$). In both embodiments, the charge ($V_{C2}$) on second timing capacitor C2 ramps up at precisely twice the rate of the charge ($V_{C1}$) on first timing capacitor C1.

When the delayed $T_{RAMPD}$ signal is asserted and charge begins to accumulate on second timing capacitor C2, a base-current compensated ramp signal ($I_{SWCOMP}$) that tracks the current ($I_{SW}$) of switch signal 54 on SW bond pad 99, is allowed to rise, as shown in FIG. 10. The DC base current error component in the current ($I_{SW}$) of switch signal 54 has been removed from the compensated ramp signal ($I_{SWCOMP}$). Thus, the compensated ramp signal ($I_{SWCOMP}$) reflects the actual current ($I_{LP}$) through primary inductor 39 and through the collector of bipolar transistor 37.

In the embodiment of the adaptive current limiter 43 of FIG. 6, the compensated ramp signal ($I_{SWCOMP}$) is generated by capacitively coupling switch signal 54 on SW bond pad 99 with a coupling capacitor to cancel the DC offset component. The charge on the coupling capacitor is held at zero with a switch until the delayed $T_{RAMPD}$ signal is asserted. When the current of the compensated ramp signal ($I_{SWCOMP}$) reaches one half of the pre-determined limit ($I_{LIM}$) of the peak current flowing through primary winding 39, the charging of second timing capacitor C2 is halted and the voltage on capacitor C2 is held. In one implementation, the time at which $I_{SWCOMP}$ reaches ½ $I_{LIM}$ is determined by comparing the voltages ($V_{SWCOMP}$ and ½ $V_{LIM}$) on the corresponding nodes. The held voltage on capacitor C2 serves as the reference voltage for determining the exact time when the compensated ramp signal ($I_{SWCOMP}$) would have reached the limit ($I_{LIM}$) of the peak current flowing through primary winding 39 had the compensated ramp signal ($I_{SWCOMP}$) begun to ramp up along with the current ($I_{SW}$) on SW bond pad 99 upon the assertion of the $T_{RAMP}$ signal.

First timing capacitor C1 continues to charge up until the time at which the voltage on first timing capacitor C1 reaches the held reference voltage on second timing capacitor C2. Timing signal 55 (also called a charge crossing signal Tcx) is asserted at the time at which the charge ($V_{C1}$) on first timing capacitor C1 reaches the charge ($V_{C2}$) on second timing capacitor C2. Timing signal 55 is asserted at the time the current through the primary inductor ($I_{LP}$) reaches the peak current limit ($I_{LIM}$) because first timing capacitor C1 has charged at half the rate of second timing capacitor C2. Thus, timing signal 55 is asserted at the target time for reaching the peak current limit ($I_{LIM}$).

Next, the falling edge of feedback signal ($T_{RAMP}$) 51 that indicates the actual time at which the current ($I_{LP}$) through primary inductor 39 has stopped increasing is compared to the rising edge of timing signal 55. The falling edge of the $T_{RAMP}$ signal indicates the end of the turn-on time when the primary inductor current ($I_{LP}$) has reached its peak and the voltage across the auxiliary winding ($V_{AUX}$) flies up.

FIG. 6 shows that adaptive current limiter 43 generates pulse width signal 58, and PWM logic 45 uses pulse width signal 58 to generate the "N-channel on" (Nchon) signal 57. Thus, the pulse width of Nchon signal 57 is controlled by pulse width generator 49 in adaptive current limiter 43. Pulse width signal 58 is generated by using delay-locked-loop-type control loop 48 to compare feedback signal 51 to timing signal 55. DLL-type control loop 48 includes a phase detector that generates a down pulse to increase the duty cycle of Nchon signal 57 by extending the falling edge beyond the rising edge of timing signal 55 if the falling edge of feedback signal 51 comes earlier than the target time at the rising edge of timing signal 55. Delaying the falling edge of Nchon signal 57 to increase the duty cycle increases the peak current ($I_P$) through primary inductor 39 on the next switching cycle. Conversely, if the falling edge of feedback signal 51 comes later than the target time at the rising edge of timing signal 55, the phase detector of control loop 48 generates an up pulse that decreases the duty cycle of Nchon signal 57 by advancing the falling edge so that it falls before the rising edge of timing signal 55. Advancing the falling edge of Nchon signal 57 to decrease the duty cycle reduces the peak current ($I_P$) through primary inductor 39 on the next switching cycle. Control loop 48 thereby maintains a constant peak current ($I_P$) of primary inductor 39 at the pre-determined value $I_{LIM}$.

It is apparent from FIG. 10 that the magnitude of the second delay time ($T_{D2}$) between when feedback signal 51 is asserted and when the delayed $T_{RAMPD}$ signal is asserted does not influence the time at which the compensated ramp signal ($I_{SWCOMP}$) reaches one half of the pre-determined limit ($I_{LIM}$) of the peak current flowing through primary winding 39, so long as the second delay time ($T_{D2}$) is less than half the time it takes for the compensated ramp signal ($I_{SWCOMP}$) to reach ½$I_{LIM}$. This is true because it is the voltage level ($V_{C2}$) on second timing capacitor C2, as opposed to the exact moment that the compensated ramp signal ($I_{SWCOMP}$) reaches ½$I_{LIM}$, that determines when the charge on the first timing capacitor C1 will cross the reference voltage level ($V_{C2}$) established on second timing capacitor C2.

When control loop 48 of adaptive current limiter 43 adjusts timing signal 55 such that the rising edge of timing signal 55 occurs at the same time as the falling edge of feedback signal 51, the peak current ($I_P$) of primary inductor 39 is made equal to the pre-determined limit ($I_{LIM}$) of the peak current. Control loop 48 matches the peak current ($I_P$) to the pre-determined limit ($I_{LIM}$) largely independently of input line voltage, temperature, process variations, component tolerance changes, and PCB layout variations.

From another perspective, the internal main MOSFET switch 44 is turned on for a period equaling the time T1 for the compensated ramp signal ($I_{SWCOMP}$) to reach ½ $I_{LIM}$ plus a width-change time ($T_{WIDTH}$). The width-change time ($T_{WIDTH}$) refers to a change in the pulse width of Nchon signal 57. Main power switch 44 is turned on at the beginning of each oscillator cycle based on the switching frequency ($f_{OSC}$) generated by oscillator 42 and is turned off at the end of the period (T1+$T_{WIDTH}$), where $T_{WIDTH}$ is adjusted by control loop 48 so that the total ramp-up time equals the expected ramp-up time, and constant output current is maintained.

Figure 11:
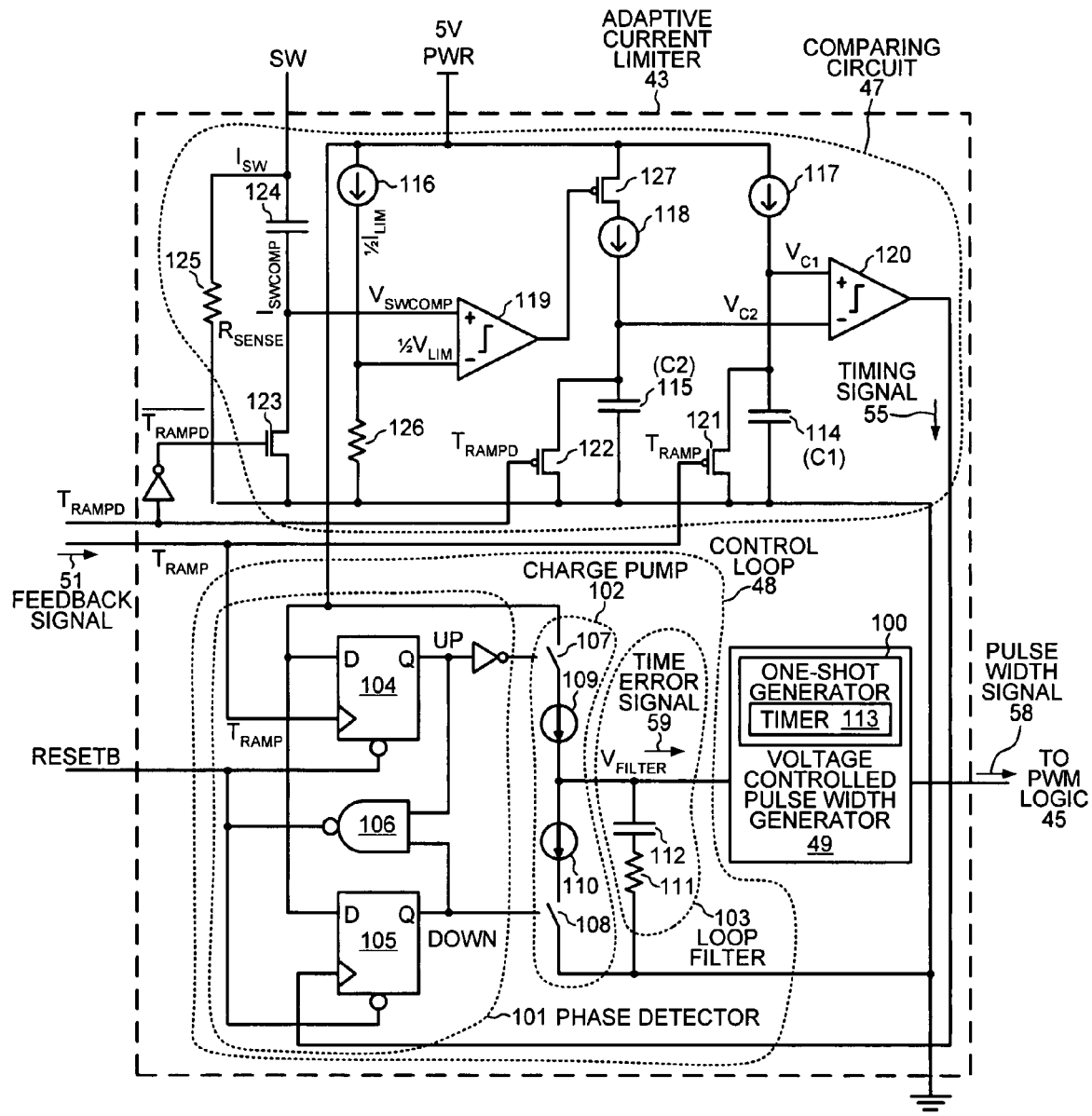
FIG. 11 is a more detailed schematic diagram of the adaptive current limiter of FIG. 6.

FIG. 11 shows a more detailed diagram of adaptive current limiter 43 of controller IC 38. Adaptive current limiter 43 includes comparing circuit 47, control loop 48 and voltage controlled pulse width generator 49. Pulse width generator 49 includes a one-shot generator 100 that generates a pulse at the appropriate pulse width of Nchon signal 57. Control loop 48 includes a phase detector 101, a charge pump 102 and a loop filter 103. Control loop 48 resembles a delay-locked-loop (DLL) and synchronizes feedback signal ($T_{RAMP}$) 51 to timing signal 55 so that pulse width generator 49 can generate pulse width signal 58. Phase detector 101 includes two D-flip-flops 104 and 105 and a NAND gate 106. Charge pump 102 includes two switches 107 and 108 and two current sources 109 and 110. Loop filter 103 includes a resistor 111 and a capacitor 112 that generate the filter voltage $V_{FILTER}$ of time error signal 59. One-shot generator 100 of pulse width generator 49 is set when the compensated ramp signal ($I_{SWCOMP}$) crosses the reference current ½$I_{LIM}$ and is cleared when a one-shot timer 113 expires. The one-shot pulse is generated after the elapse of a time period that is inversely proportional to the filter voltage $V_{FILTER}$ of time error signal 59 and proportional to the time period between the falling edge of feedback signal 51 and the rising edge of timing signal 55.

Adaptive current limiter 43 also includes first timing capacitor (C1) 114, second timing capacitor (C2) 115, three timing bias-current sources 116-118, a first comparator 119, a second comparator 120, two p-channel FETs 121-122, an n-channel FET 123, a capacitor 124 and a sense resistor ($R_{SENSE}$) 125, which represents the on-resistance of main power switch 44. First timing capacitor (C1) 114 is twice as large as second timing capacitor (C2) 115.

When the current ($I_{LP}$) through primary winding 39 begins to ramp up and feedback signal 51 is asserted, p-channel FET 121 turns off, and timing bias-current source 117 begins to charge first timing capacitor (C1) 114. Thus, the charge ($V_{C1}$) on first timing capacitor C1 ramps up, as shown in FIG. 10. After the second delay time ($T_{D2}$), the delayed $T_{RAMPD}$ signal is asserted, and p-channel FET 122 turns off, allowing timing bias-current source 118 to begin charging second timing capacitor (C2) 115. The slew rate of capacitor (C2) 115 is twice that of capacitor (C1) 114 because capacitor (C2) 115 is half the size of capacitor (C1) 114.

When the delayed $T_{RAMPD}$ signal is asserted, the n-channel FET 123 also turns off, and the base-current compensated ramp signal ($I_{SWCOMP}$) is generated on the non-inverting input lead of first comparator 119 by using capacitor 124 to remove the DC offset of the current ($I_{SW}$) of switch signal 54 caused by the base current of external bipolar transistor 37. First comparator 119 then compares the voltage ($V_{SWCOMP}$) corresponding to compensated ramp signal ($I_{SWCOMP}$) to a voltage $\frac{1}{2}V_{LIM}$ corresponding to the reference current $\frac{1}{2}I_{LIM}$ that is generated by timing bias-current source 116 and a resistor 126. In another implementation, instead of using first voltage comparator 119, compensated ramp signal ($I_{SWCOMP}$) is compared directly to the reference current $\frac{1}{2}I_{LIM}$ using a current comparator with sense FETs. When the compensated ramp signal ($I_{SWCOMP}$) reaches the reference current $\frac{1}{2}I_{LIM}$, first comparator 119 asserts a trip signal that turns off a p-channel FET 127 and thereby turns off timing bias-current source 118. When timing bias-current source 118 is turned off, the charge ($V_{C2}$) on second timing capacitor (C2) 115 is held. The charge ($V_{C1}$) on first timing capacitor (C1) 114, however, continues to ramp up at half the rate of the charging of second timing capacitor C2. Second comparator 120 compares the rising charge ($V_{C1}$) on first timing capacitor C1 to the held charge ($V_{C2}$) on second timing capacitor C2. When the rising charge ($V_{C1}$) reaches the held voltage ($V_{C2}$) on second timing capacitor C2, the target time is reached, and second comparator 120 asserts timing signal 55. Phase detector 101 uses the rising edge of timing signal 55 as the moment that the current ($I_{LP}$) through primary inductor 39 should equal the desired pre-determined limit ($I_{LIM}$) of the peak current ($I_P$) flowing through primary inductor 39.

In the embodiment of FIG. 11, the relative sizes of the first and second timing capacitors 114-115 are used to generate the correct timing in timing signal 55. Other circuit topologies, however, can also be used to achieve the correct timing ratios. For example, equal-sized timing capacitors can be used with a first current source 117 that generates half the current of a second current source 118. Alternatively, second comparator 120 can be made to assert timing signal 55 when the rising charge ($V_{C1}$) is twice as large as the held voltage ($V_{C2}$), and the timing capacitors and current sources are the same size.

In the embodiment of FIG. 11, the filter voltage $V_{FILTER}$ generated by control loop 48 is used as time error signal 59 to reflect the time difference between the falling edge of feedback signal 51 and the rising edge of timing signal 55. The rising edge of timing signal 55 is generated based on the time it takes for the compensated ramp signal ($I_{SWCOMP}$) to reach the pre-determined fixed reference current $\frac{1}{2}I_{LIM}$. In another embodiment, the filter voltage $V_{FILTER}$ is used to adjust the reference current $\frac{1}{2}I_{LIM}$ produced by current source 116 and resistor 126 such that second timing capacitor (C2) 115 reaches a reference voltage simultaneously with first timing capacitor (C1) 114. In such an embodiment, an adjustable reference current $\frac{1}{2}I_{LIM}$ is increased when the falling edge of feedback signal 51 comes before the rising edge of timing signal 55, indicating the need to increase the peak current ($I_P$) through primary inductor 39. Correspondingly, the adjustable reference current $\frac{1}{2}I_{LIM}$ is decreased when the falling edge of feedback signal 51 comes after the rising edge of timing signal 55, indicating the need to decrease the peak current ($I_P$).

In yet another embodiment, the switching frequency ($f_{OSC}$) of oscillator 42 is adjusted based on time error signal 59 in order to generate a constant output current $I_{OUT}$ of flyback converter 30. The switching frequency ($f_{OSC}$) is adjusted by adjusting the oscillator current $I_{OSC}$ for a given oscillator timing capacitance $C_{OSC}$ according to equation (5). The oscillator current $I_{OSC}$ is adjusted by adjusting the resistance $R_{OSC}$ of an internal IC resistor in oscillator 42. Equation (3) above shows that $I_{OUT}$ is proportional to the switching frequency ($f_{OSC}$) of oscillator 42. Thus, by adjusting the switching frequency ($f_{OSC}$) using the time error signal 59 derived from the delay between the target time and the falling edge of feedback signal 51, the output current $I_{OUT}$ is held constant despite variations in the peak current ($I_P$) of primary inductor 39. Note that in equation (3), the output current $I_{OUT}$ is proportional to the square of the peak current ($I_P$) of primary inductor 39 and, therefore, the switching frequency ($f_{OSC}$) must be adjusted inversely proportionally to the square of the peak current ($I_P$) in order to maintain a constant output current ($I_{OUT}$).

In a further embodiment, the output range of PWM error amplifier 76 is adaptively adjusted using the time error signal 59 derived from the delay between the target time and the falling edge of feedback signal 51 in order to maintain a constant output current $I_{OUT}$. When flyback converter 30 operates in normal constant-voltage mode, the voltage of error amplifier output signal 77 output by PWM error amplifier 76 is proportional to the output current ($I_{OUT}$). Moreover, in constant-voltage mode the on-time of the main power switch 44, as reflected by the time period $T_{RAMP}$ in FIG. 8, is controlled by the voltage signal output by current sense amplifier 85 and error amplifier output signal 77. The voltage of error amplifier output signal 77 output by error amplifier 76 increases as output current $I_{OUT}$ increases, thus maintaining a constant output voltage.

Typically, main power switch 44 is turned on at the start of each clock cycle, and the voltage signal output by current sense amplifier 85 ramps up proportionally to the current ($I_{LP}$) through the primary inductor, which itself ramps up a the rate $dI/dt=V_P/L_P$, where $V_P$ is the voltage across the primary inductor. The main power switch 44 is turned off when the voltage signal output by current sense amplifier 85 reaches the voltage of error amplifier output signal 77 output by PWM error amplifier 76. The peak current ($I_P$) of the primary inductor can be limited by clamping the voltage of regulation signal 86 output by error comparator 81 at a maximum level. Thus, the peak current ($I_P$) limit can be controlled by adjusting this clamp voltage of regulation signal 86. Time error signal 59 generated by control loop 48 is used adaptively to control the clamp voltage to maintain a constant output current ($I_{OUT}$). In this embodiment, whether flyback converter 30 is regulating a constant output voltage or a constant output current, the time at which main power switch 44 is turned off is always determined by the intersection of the voltage signal output by current sense amplifier 85 and the voltage of error amplifier output signal 77 output by PWM error amplifier 76. In a steady-state constant-voltage mode of operation of flyback converter 30, the voltage of error amplifier output signal 77 falls within its normal range below the clamp voltage, whereas in the constant-current mode, the voltage of error amplifier output signal 77 is clamped at a maximum level to limit peak current ($I_P$). In the constant-current mode, and the clamp level is adaptively adjusted by control loop 48 to control the time period $T_{RAMP}$ in order to maintain a constant output current ($I_{OUT}$).

Although the present invention has been described in connection with certain specific embodiments for instructional purposes, the present invention is not limited thereto. In addition to providing adaptive primary inductor peak current limiting, other embodiments employ adaptive primary inductance compensation. Moreover, as opposed to the embodiment of FIG. 5 that uses external high-voltage NPN bipolar transistor 37 in an emitter switching configuration, other embodiments directly drive primary winding 39 using an internal high-voltage power switch in controller IC 38. In addition, a MOSFET instead of a bipolar transistor can be used as the external switch in order further to increase the power handling capability and switching frequency of flyback converter 30.

Figure 12:
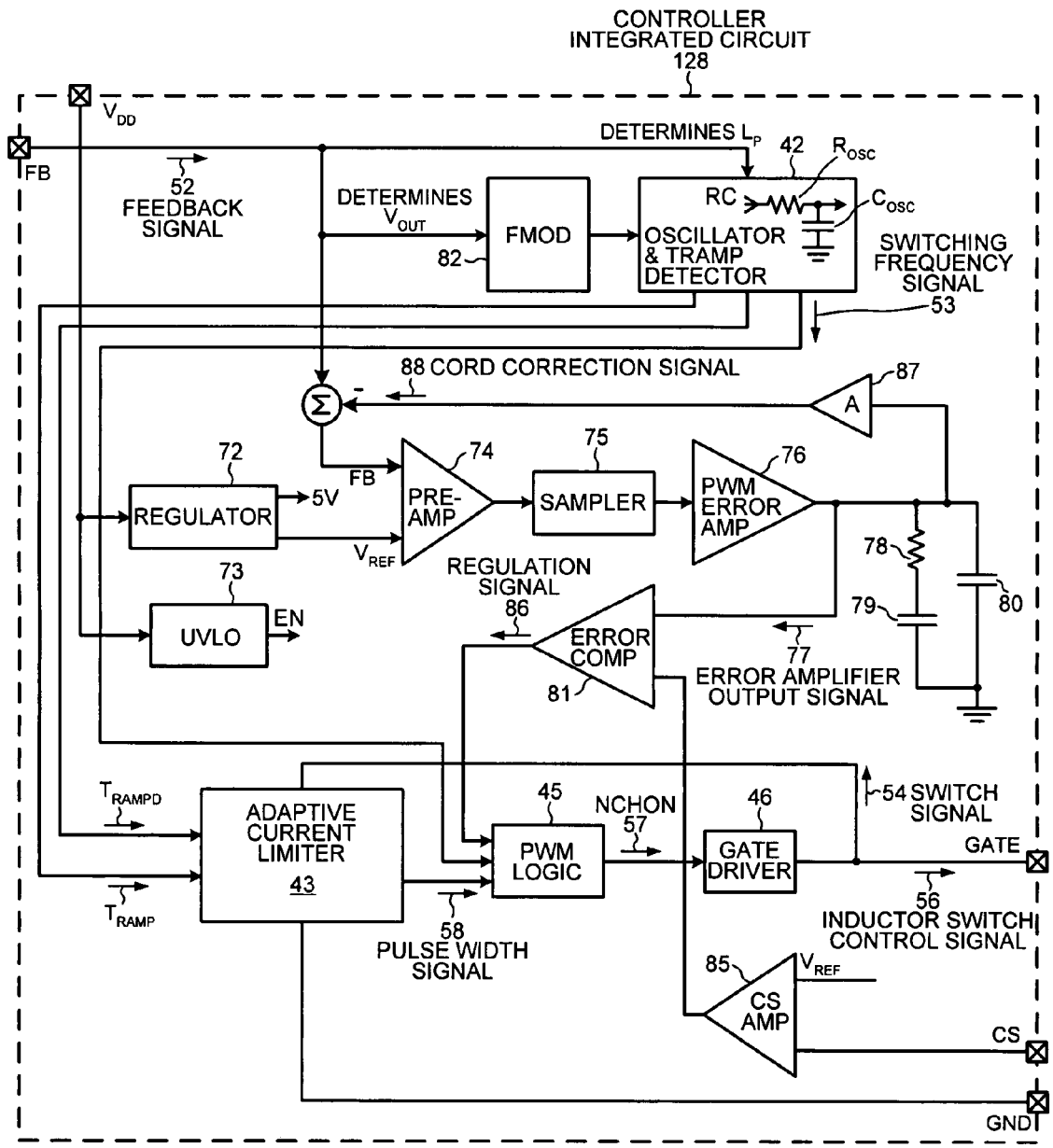
FIG. 12 is a more detailed schematic diagram of an alternative embodiment of the controller integrated circuit of FIG. 6.

FIG. 12 shows an alternative embodiment of a PWM controller IC chip 128. Controller IC 128 does not include an internal main MOSFET switch, a smaller current sensing internal MOSFET, or a current sensing resistor coupled to the current sensing MOSFET. In this embodiment, the current driving capability of gate driver 46 results in improved control for larger MOSFETs.

Figure 13:
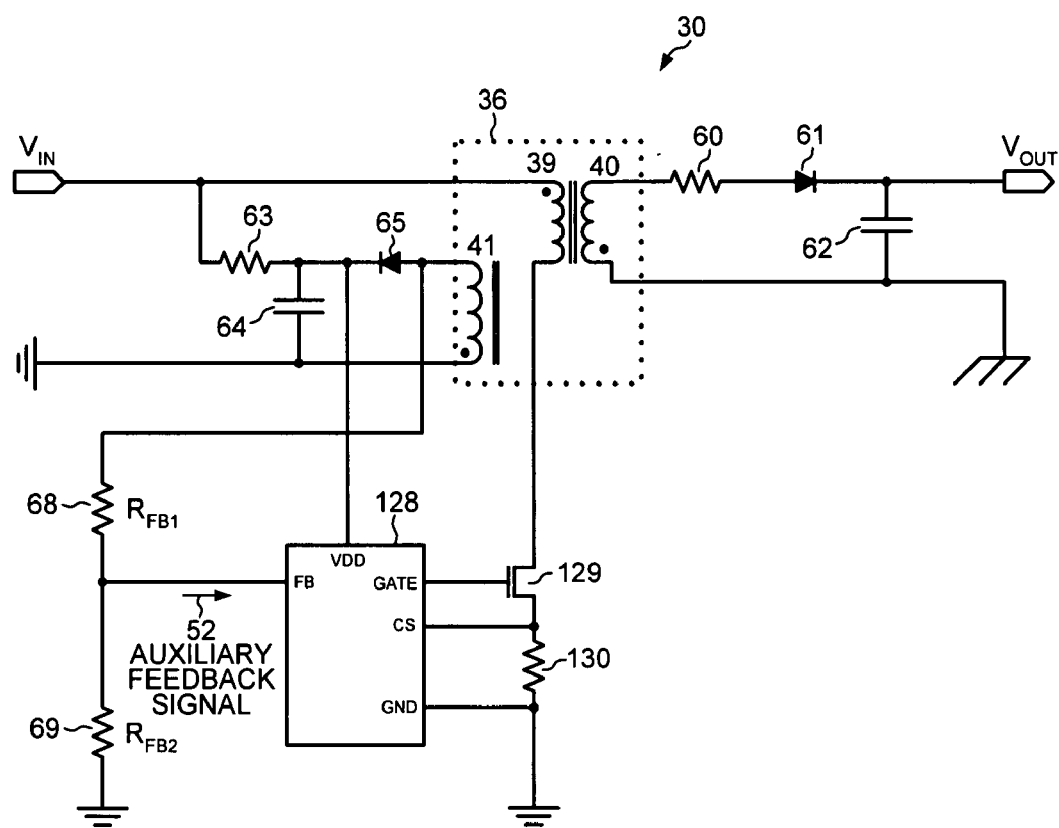
FIG. 13 is a schematic diagram of the controller integrated circuit of FIG. 12 implemented with an external MOSFET and current sense resistor.

FIG. 13 shows the alternative embodiment of flyback converter 30 that includes controller IC chip 128 of FIG. 12. The alternative embodiment of flyback converter 30 includes an external MOSFET 129 and a current sense resistor 130.

Figure 14:
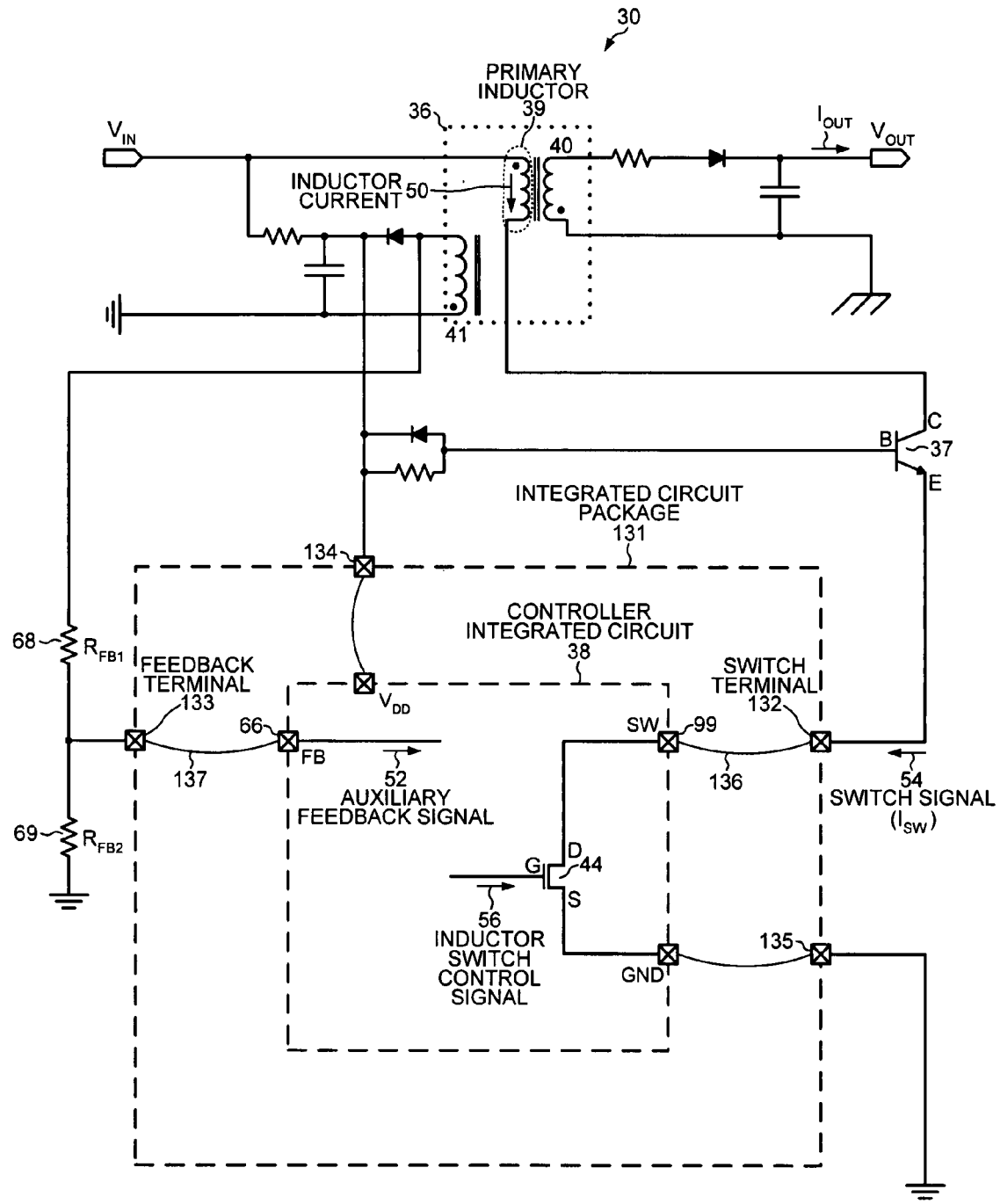
FIG. 14 is a schematic diagram of the flyback converter of FIG. 3 in which the controller integrated circuit is packaged in an integrated circuit package.

FIG. 14 shows flyback converter 30 with controller IC 38 in an integrated circuit package 131. By using only auxiliary feedback signal 52 to provide feedback to control the output current and voltage of flyback converter 30, controller IC 38 can be packaged in an integrated circuit package having only four terminals. Each terminal of an integrated circuit package adds cost. Thus, it is less expensive to produce controller IC 38 packaged in integrated circuit package 131 than it is to produce controller ICs requiring packages with more than four terminals. Integrated circuit package 131 has only four terminals: a switch terminal 132, a feedback terminal 133, a power terminal 134 and a ground terminal 135. In the embodiment of FIG. 14, switch terminal 132 is connected to bond pad SW 99 by a bond wire 136. Switch signal 54 is received onto switch terminal 132 and then travels over bond wire 136 to bond pad SW 99. Depending on the type of package, switch terminal 132 can be a lead of a quad flat pack, a land of a land grid array (LGA), a pin of a pin grid array (GPA), a pin of a dual in-line package (DIP) or a pin of a single in-line package. In an embodiment in which integrated circuit package 131 is a ball grid array package and controller IC 38 is packaged in a flip-chip manner, switch terminal 132 is not connected to bond pad SW 99 by a bond wire. In a ball-grid-array embodiment, there is a bump on bond pad SW 99, and switch terminal 132 is a bond ball connected to the bump. In various embodiments, feedback terminal 133, power terminal 134 and ground terminal 135 can likewise be bond balls of a ball grid array, leads of a quad flat pack, lands of a land grid array (LGA), pins of a pin grid array (GPA), pins of a dual in-line package (DIP) or pins of a single in-line package.

In embodiments in which feedback bond pad FB 66 is connected to feedback terminal 133 by a bond wire 137, controller IC 38 receives an indication of the output voltage ($V_{OUT}$) of secondary winding 40 via feedback terminal 133. Auxiliary feedback signal 52 is received onto feedback terminal 133 and then travels over bond wire 137 to feedback bond pad FB 66.

Although pulse-width-modulation (PWM) logic 45 is described above as employing pulse width modulation in the generation of Nchon signal 57 and inductor switch control signal 56, variable frequency modulation can be used as an alternative to fixed frequency PWM. In alternative embodiments, variable-frequency pulse frequency modulation (PFM) is used to generate Nchon signal 57 and inductor switch control signal 56.

Figure 15:
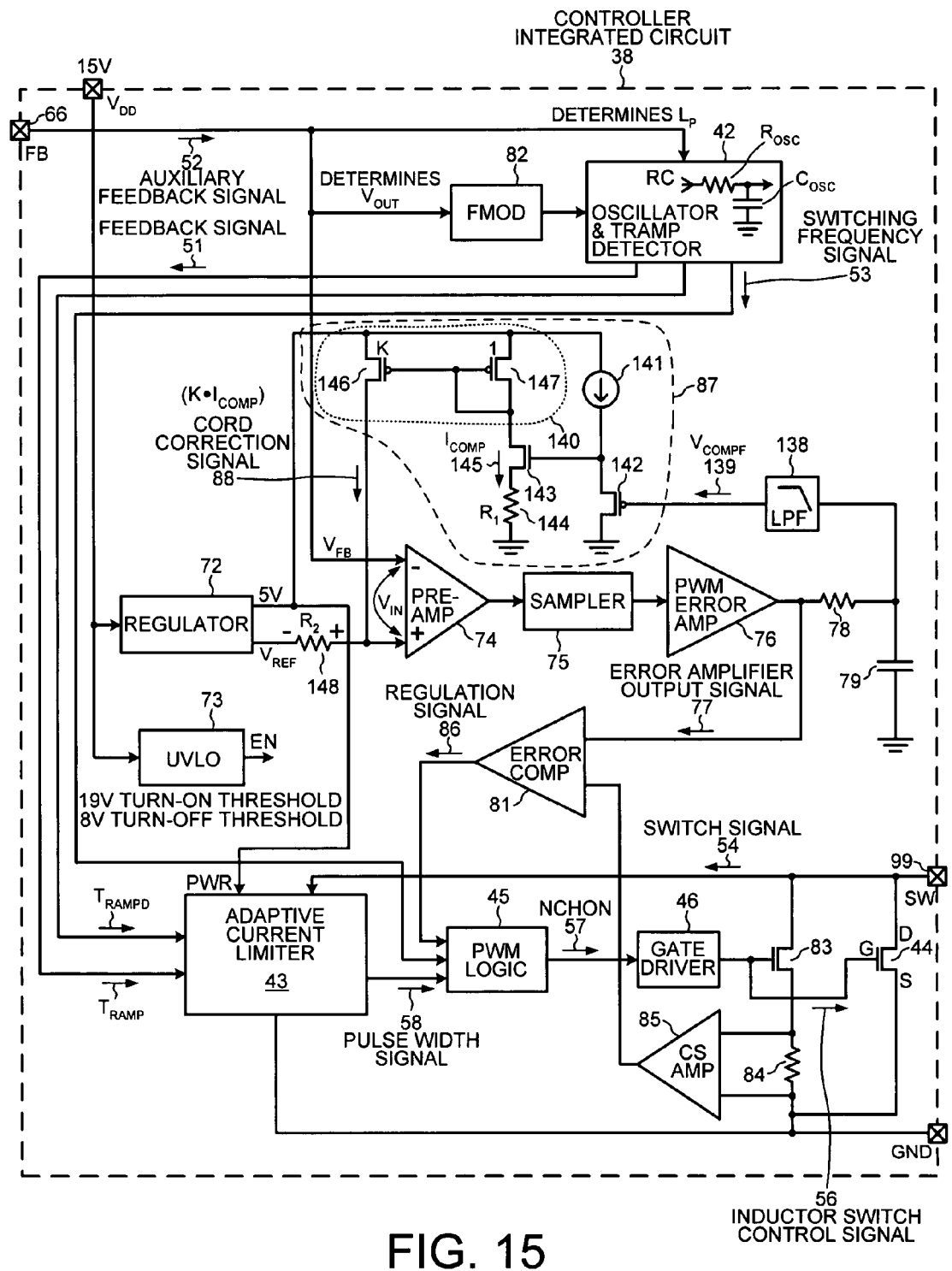
FIG. 15 is a schematic diagram of the pulse width modulation controller integrated circuit of FIG. 5, including another embodiment of a cord correction circuit.

FIG. 15 shows an alternative embodiment of the cord correction circuit 87 shown in FIG. 6. Cord correction circuit 87 compensates for the loss of output voltage at the plug end of a charger cord caused by the series resistance of the charger cord of flyback converter 30. In the embodiment of FIG. 6, the voltage of cord correction signal 88 is subtracted from the feedback voltage of auxiliary feedback signal 52. In contrast, in the embodiment of FIG. 15, the voltage of cord correction signal 88 is summed with the reference voltage $V_{REF}$ generated by regulator 72. Thus, in the embodiment of FIG. 6, pre-amplifier 74 compares the reference voltage $V_{REF}$ generated by regulator 72 to a corrected feedback voltage of auxiliary feedback signal 52. In the embodiment of FIG. 15, pre-amplifier 74 compares the feedback voltage $V_{FB}$ of auxiliary feedback signal 52 to a corrected reference voltage $V_{REF}$. In FIG. 15, the difference between the voltages on the inverting and non-inverting input leads of pre-amplifier 74 is designated as an input voltage differential $V_{IN}$.

In the embodiment of FIG. 15, error amplifier output signal 77 output by PWM error amplifier 76 passes through resistor 78 and a low-pass filter 138 to generate a filtered compensation signal ($V_{COMPF}$) 139 that is received by cord correction circuit 87. Cord correction circuit 87 includes a current mirror 140, a current source 141, a p-channel FET 142, an n-channel FET 143 and a first resistor $R_1$ 144. P-channel FET 142 and n-channel FET 143 are chosen to have approximately the same gate-source voltages ($V_{GS}$).

A compensation current ($I_{COMP}$) 145 flows from FET 143 across first resistor $R_1$ 144. The magnitude of compensation current ($I_{COMP}$) 145 approximately equals the voltage of filtered compensation signal ($V_{COMPF}$) 139 divided by the resistance of first resistor $R_1$ 144. Current mirror 139 is formed by p-channel FETs 146 and 147. FET 146 is K times as large as FET 147. Thus, the magnitude of the current of cord correction signal 88 output by cord correction circuit 87 approximately equals K times the compensation current ($I_{COMP}$) 145. In the embodiment of FIG. 15, the voltage of cord correction signal 88 is summed with the reference voltage $V_{REF}$ generated by regulator 72 using a second resistor $R_2$ 148.

The magnitude of the voltage of error amplifier output signal 77 output by PWM error amplifier 76 is approximately proportional to the output current ($I_{OUT}$) when flyback converter 30 operates in the constant-voltage mode. Thus, the voltage of filtered compensation signal ($V_{COMPF}$) 139 is also approximately proportional to the output current ($I_{OUT}$) of flyback converter 30. Consequently, the input voltage differential $V_{IN}$ between the input leads of pre-amplifier 74 approximately equals:

$$V_{IN} = V_{REF} + K \cdot \frac{R_2}{R_1} \cdot V_{COMPF} - V_{FB}.$$

With a cord resistance of 0.25 ohms, a typical charger that charges at five volts per one amp has an output voltage error of about 5% of the nominal five-volt output voltage. (1 amp× 0.25 ohms=0.25 volts) In this example, the output voltage of flyback converter 30 is five volts, but the plug voltage at the end of the charger cord is only 4.75 volts. Consequently, cord correction circuit 87 provides a 5% correction signal. For an internal reference voltage $V_{REF}$ of 2.5 volts generated by regulator 72, cord correction signal 88 is generated with a voltage of 0.125 volts. The values of K, $R_1$ and $R_2$ are chosen to achieve the 0.125 volts. In this example, by providing the 5% correction signal, an accurate constant voltage of five volts is achieved at the plug end of the charger cord that connects flyback converter 30 to the device that is to be charged, such as a cell phone.

Accordingly, various modifications, adaptations, and combinations of various features of the described embodiments can be practiced without departing from the scope of the invention as set forth in the claims.

What is claimed is:

1. A method comprising:
   (a) receiving a feedback signal indicative of a voltage across a secondary winding of a power converter, wherein the secondary winding is on a secondary side of the power converter, wherein the feedback signal has a voltage, wherein the power converter outputs an output voltage and has a charger cord with a plug, wherein the charger cord has a resistance, and wherein a plug voltage is present on the charger cord at the plug;
   (b) generating a cord correction signal, wherein the cord correction signal has a voltage;
   (c) generating a corrected feedback signal by subtracting the voltage of the cord correction signal from the voltage of the feedback signal, wherein the corrected feedback signal has a voltage;
   (d) comparing a reference voltage to the voltage of the corrected feedback signal; and
   (e) using the comparing in (d) to adjust the output voltage to compensate for a decrease in the plug voltage caused by the resistance of the charger cord.

2. The method of claim 1, wherein the power converter is a flyback converter.

3. The method of claim 1, wherein the plug is connected to a cell phone.

4. The method of claim 1, wherein the adjusting in (e) is performed by an integrated circuit that is packaged in an integrated circuit package having no more than four terminals.

5. The method of claim 1, wherein the feedback signal is generated using a voltage across an auxiliary winding, and wherein the auxiliary winding is magnetically coupled to the secondary winding.

6. The method of claim 5, wherein the reference voltage is generated using the voltage across the auxiliary winding.

7. The method of claim 1, wherein the power converter has an inductor switch and a primary winding, wherein the primary winding is on a primary side of the power converter, wherein an inductor current flows through the primary winding and ramps up to a peak current while the inductor switch is turned on, and wherein the inductor switch is controlled by an inductor switch control signal having a pulse width, further comprising:
   (f) controlling the peak current through the primary winding by adjusting the pulse width of the inductor switch control signal.

8. A method comprising:
   (a) receiving a feedback signal indicative of a voltage across a secondary winding of a power converter, wherein the secondary winding is on a secondary side of the power converter, wherein the feedback signal has a voltage, wherein the power converter outputs an output voltage and has a charger cord with a plug, wherein the charger cord has a resistance, and wherein a plug voltage is present on the charger cord at the plug;
   (b) generating a cord correction signal, wherein the cord correction signal has a voltage;
   (c) generating a corrected reference voltage by summing a reference voltage with the voltage of the cord correction signal;
   (d) comparing the corrected reference voltage to the voltage of the feedback signal; and
   (e) using the comparing in (d) to adjust the output voltage to compensate for a decrease in the plug voltage caused by the resistance of the charger cord.

9. The method of claim 8, wherein the adjusting in (e) is performed by an integrated circuit that is packaged in an integrated circuit package having no more than four terminals.

10. The method of claim 8, wherein the feedback signal is generated using a voltage across an auxiliary winding, and wherein the auxiliary winding is magnetically coupled to the secondary winding.

11. The method of claim 8, wherein the power converter has an inductor switch and a primary winding, wherein the primary winding is on a primary side of the power converter, wherein an inductor current flows through the primary winding and ramps up to a peak current while the inductor switch is turned on, and wherein the inductor switch is controlled by an inductor switch control signal having a pulse width, further comprising:
   (f) controlling the peak current through the primary winding by adjusting the pulse width of the inductor switch control signal.

12. A power converter that outputs an output voltage, comprising:
   a secondary winding on a secondary side of the power converter;
   an auxiliary winding that is magnetically coupled to the secondary winding, wherein the auxiliary winding is on a primary side of the power converter, wherein a feedback signal is generated using a voltage across the auxiliary winding;
   a charger cord with a plug, wherein the charger cord has a resistance, and wherein a plug voltage is present on the charger cord at the plug; and
   a cord correction circuit, wherein the cord correction circuit receives the feedback signal and generates a cord correction signal, wherein the output voltage of the power converter is adjusted using the cord correction signal to compensate for a decrease in the plug voltage caused by the resistance of the charger cord.

13. The power converter of claim 12, wherein the power converter is a flyback converter.

14. The power converter of claim 12, wherein the feedback signal has a voltage, wherein the cord correction signal has a voltage, and wherein a corrected feedback signal is generated by subtracting the voltage of the cord correction signal from the voltage of the feedback signal, wherein the corrected feedback signal has a voltage, further comprising:
   a pre-amplifier that compares a reference voltage to the voltage of the corrected feedback signal, wherein the output voltage of the power converter is adjusted using the comparison of the reference voltage to the voltage of the corrected feedback signal.

15. The power converter of claim 14, wherein the reference voltage is generated using the voltage across the auxiliary winding.

16. The power converter of claim 12, wherein the feedback signal has a voltage, wherein the cord correction signal has a voltage, and wherein a corrected reference voltage is generated by summing a reference voltage with the voltage of the cord correction signal, further comprising:
   a pre-amplifier that compares the corrected reference voltage to the voltage of the feedback signal, wherein the output voltage of the power converter is adjusted using the comparison of the corrected reference voltage to the voltage of the feedback signal.

17. The power converter of claim 12, wherein the cord correction circuit is part of an integrated circuit that is packaged in an integrated circuit package having no more than four terminals.

18. A power converter that outputs an output voltage, comprising:
- a secondary winding on a secondary side of the power converter;
- an auxiliary winding that is magnetically coupled to the secondary winding, wherein the auxiliary winding is on a primary side of the power converter, wherein a feedback signal is generated using a voltage across the auxiliary winding;
- a charger cord with a plug, wherein the charger cord has a resistance, and wherein a plug voltage is present on the charger cord at the plug; and
- means for adjusting the output voltage to compensate for a decrease in the plug voltage caused by the resistance of the charger cord.

19. The power converter of claim 18, wherein the means receives the feedback signal and generates a cord correction signal.

20. The power converter of claim 19, wherein the feedback signal has a voltage, wherein the cord correction signal has a voltage, wherein the means is part of an integrated circuit, wherein the integrated circuit generates a corrected reference voltage by summing a reference voltage with the voltage of the cord correction signal, wherein the integrated circuit compares the corrected reference voltage to the voltage of the feedback signal, and wherein the output voltage of the power converter is adjusted using the comparison of the corrected reference voltage to the voltage of the feedback signal.

21. The power converter of claim 19, wherein the feedback signal has a voltage, wherein the cord correction signal has a voltage, wherein the means is part of an integrated circuit, wherein the integrated circuit generates a corrected feedback signal by subtracting the voltage of the cord correction signal from the voltage of the feedback signal, wherein the corrected feedback signal has a voltage, wherein the integrated circuit compares a reference voltage to the voltage of the corrected feedback signal, and wherein the output voltage of the power converter is adjusted using the comparison of the reference voltage to the voltage of the corrected feedback signal.

22. The power converter of claim 18, wherein the means is part of an integrated circuit that is packaged in an integrated circuit package having no more than four terminals.

23. The power converter of claim 18, further comprising:
- a primary winding on the primary side of the power converter;
- an inductor switch that is turned on by an inductor switch control signal, wherein the primary winding has an actual inductance that deviates from a stated inductance, wherein an inductor current flows through the primary winding and ramps up to a peak current while the inductor switch is turned on at a switching frequency; and
- means for maintaining the peak current at a constant magnitude while adjusting the switching frequency to compensate for the actual inductance deviating from the stated inductance.

\* \* \* \* \*